United States Patent
Ise

(10) Patent No.: US 8,436,928 B2
(45) Date of Patent: *May 7, 2013

(54) IMAGE SENSING APPARATUS AND METHOD WITH DRIVE CONTROL VARIATION OF EACH OF THE PLURALITY OF OUTPUT FIELDS

(75) Inventor: Makoto Ise, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 128 days.

This patent is subject to a terminal disclaimer.

(21) Appl. No.: 13/075,225

(22) Filed: Mar. 30, 2011

(65) Prior Publication Data

US 2011/0176040 A1    Jul. 21, 2011

Related U.S. Application Data

(63) Continuation of application No. 11/925,155, filed on Oct. 26, 2007, now Pat. No. 7,940,320.

(30) Foreign Application Priority Data

Nov. 1, 2006   (JP) ................................ 2006-298212
Mar. 30, 2007   (JP) ................................ 2007-093413

(51) Int. Cl.
  *H04N 5/335*   (2011.01)
  *H04N 5/217*   (2011.01)

(52) U.S. Cl.
  USPC ............ 348/312; 348/241; 348/296; 348/317

(58) Field of Classification Search .......................... None
  See application file for complete search history.

(56) References Cited

U.S. PATENT DOCUMENTS

| | | | | |
|---|---|---|---|---|
| 5,422,670 | A  * | 6/1995 | Fukui ............................. | 348/296 |
| 6,947,087 | B2 * | 9/2005 | Egawa et al. .................. | 348/304 |
| 6,999,120 | B1 * | 2/2006 | Egawa et al. .................. | 348/296 |
| 7,804,540 | B2 * | 9/2010 | Yanai ............................. | 348/319 |
| 7,880,789 | B2 * | 2/2011 | Kobayashi ..................... | 348/311 |
| 8,174,589 | B2 * | 5/2012 | Ise ................................. | 348/241 |

FOREIGN PATENT DOCUMENTS

| | | |
|---|---|---|
| JP | 2002-010144 A | 1/2002 |
| JP | 2003-244554 A | 8/2003 |
| JP | 2004-088544 A | 3/2004 |
| JP | 2006-2544494 A | 9/2006 |

OTHER PUBLICATIONS

The above references were cited in a Dec. 5, 2011 Japanese Office Action, which is enclosed without an English Translation, that issued in Japanese Patent Application No. 2006-298212.

* cited by examiner

*Primary Examiner* — Ngoc-Yen Vu
(74) *Attorney, Agent, or Firm* — Cowan, Liebowitz & Latman, P.C.

(57) ABSTRACT

An image sensing apparatus includes an image sensing unit that performs image sensing by converting incoming light into electrical signals, a control unit that controls driving of the image sensing unit so as to read out the electrical signals by each area of a plurality of areas of the image sensing unit, and a signal processing unit that processes the electrical signals read out by each of the plurality of areas. The control unit varies a horizontal cycle that drives the image sensing unit for each of the plurality of areas.

8 Claims, 27 Drawing Sheets

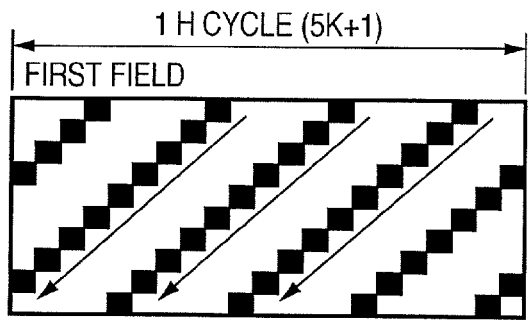
FIG. 6A
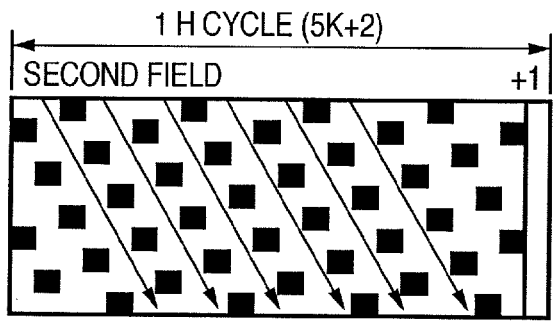
FIG. 6B
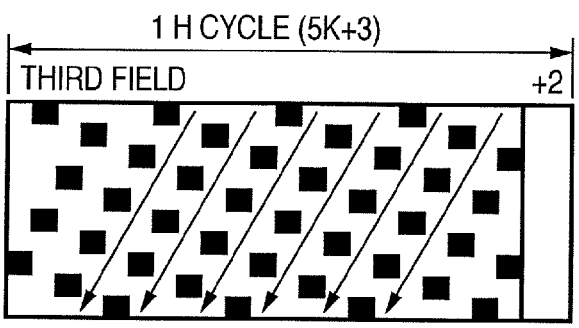
FIG. 6C
FIG. 6D
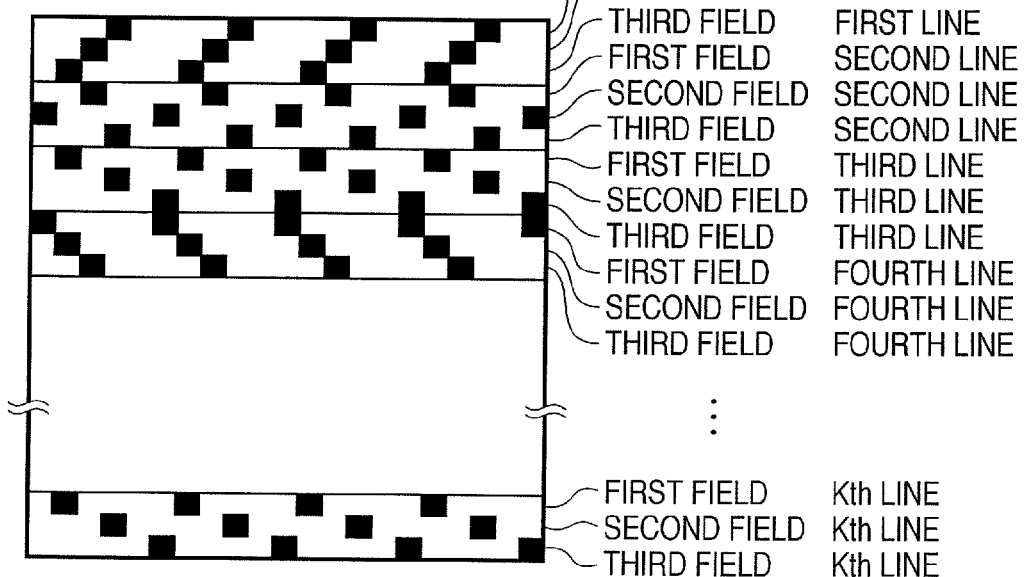

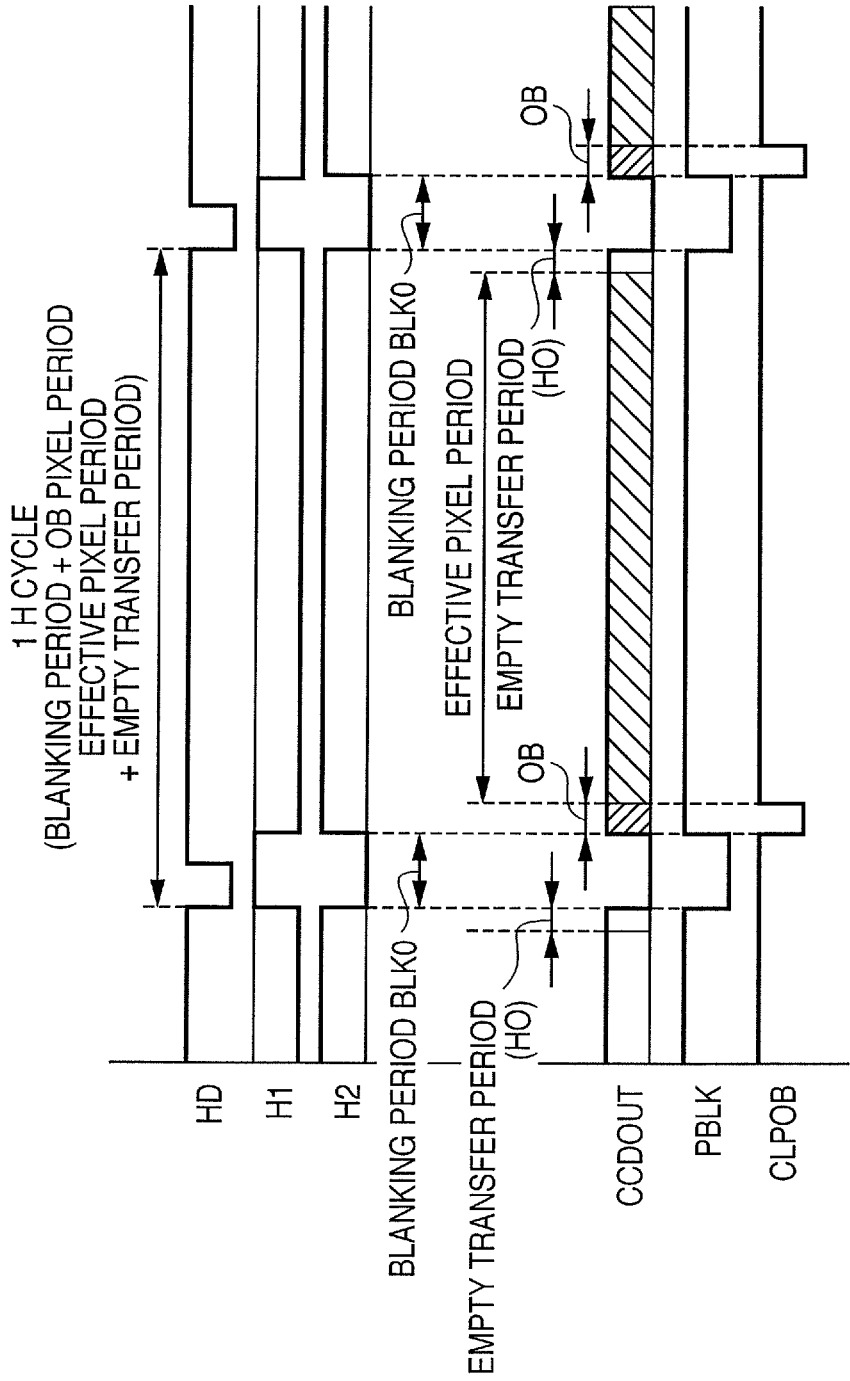

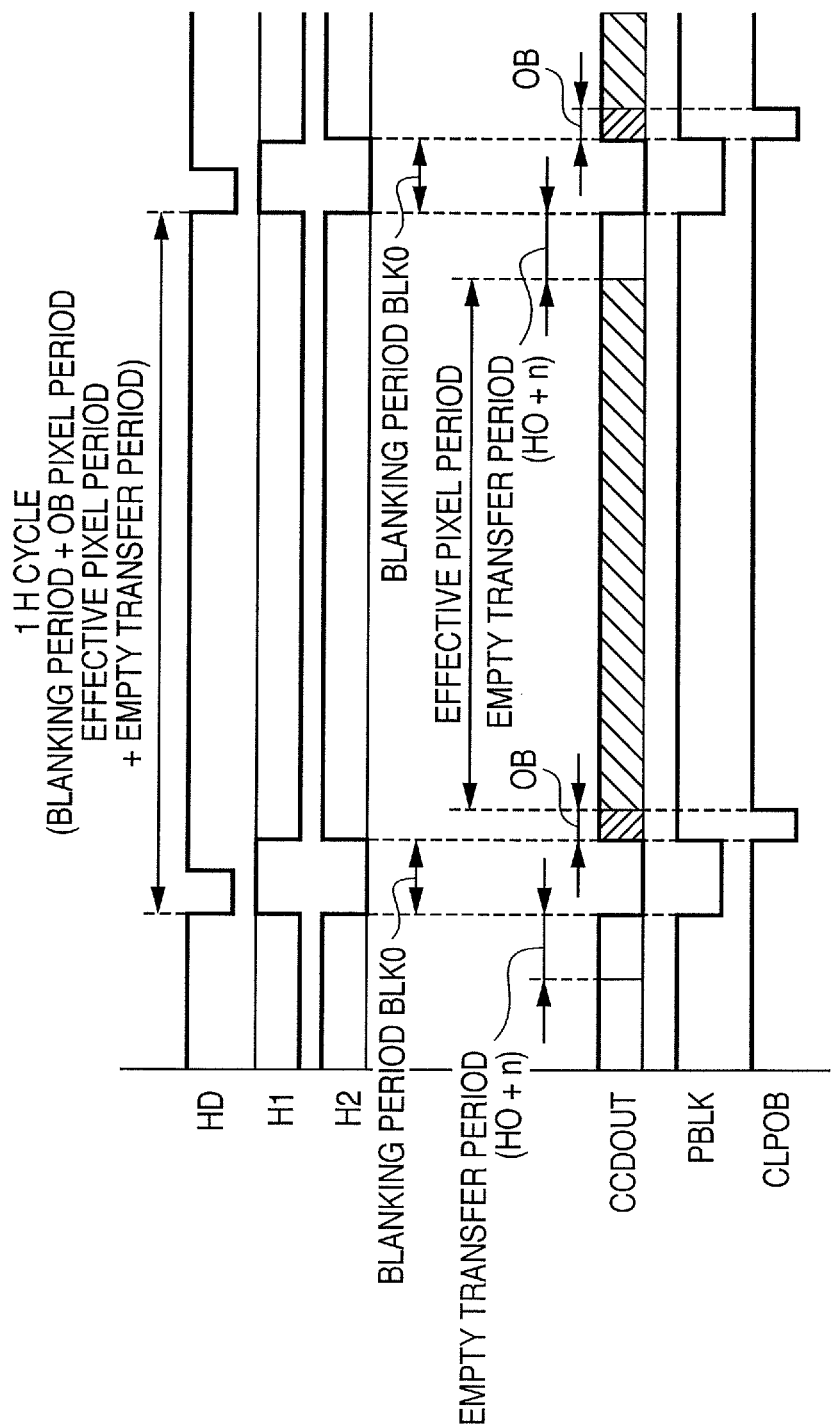

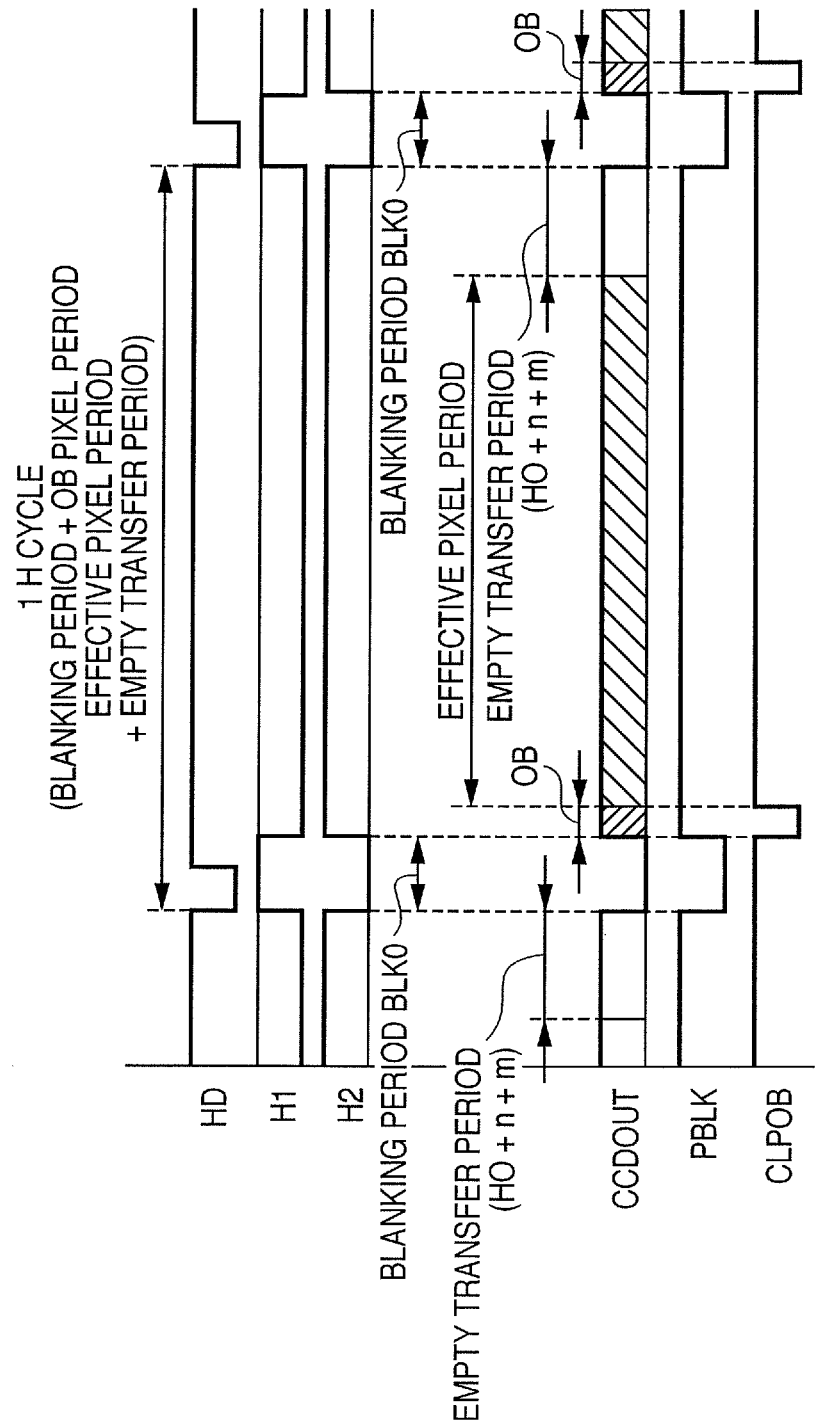

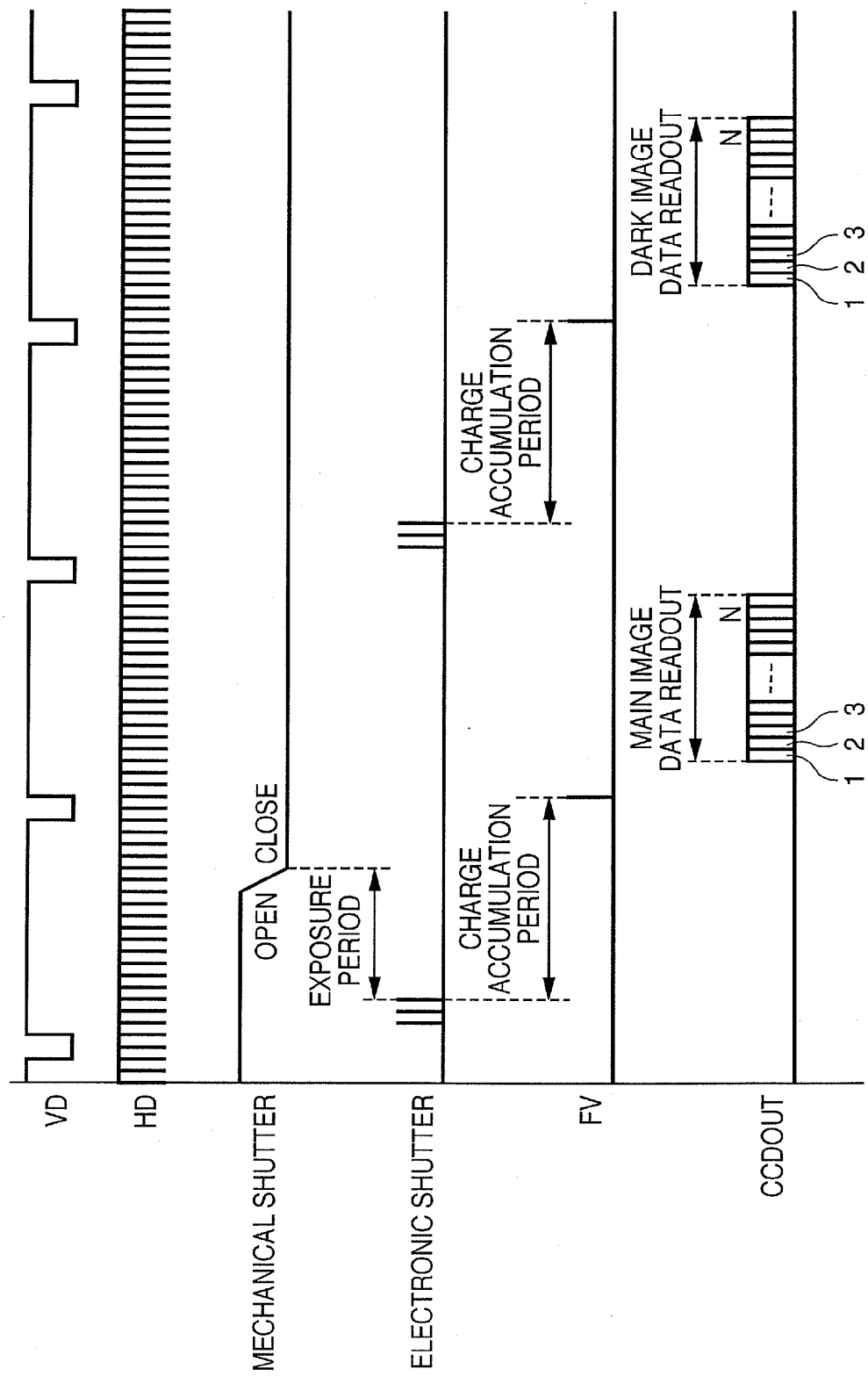

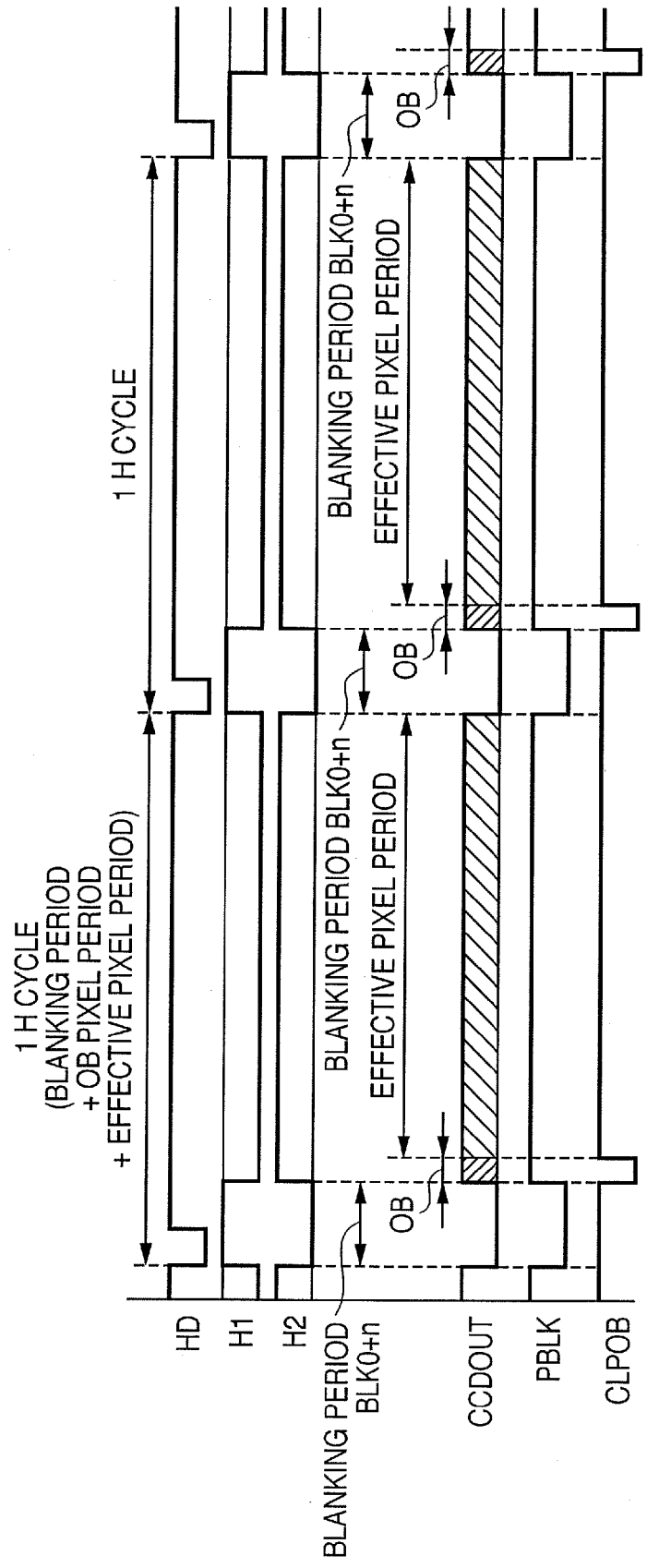

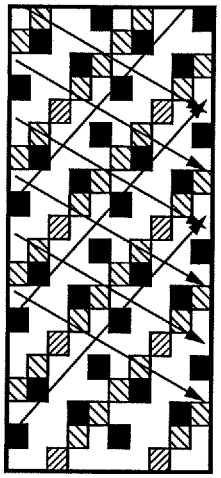
FIG. 11A MAIN IMAGE
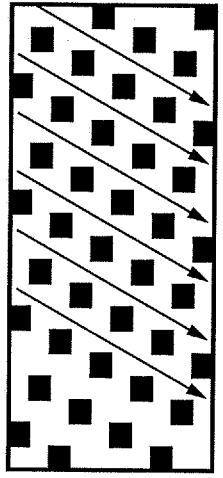
FIG. 11B DARK IMAGE
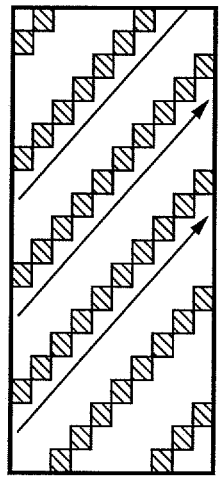
FIG. 11C DARK NOISE CORRECTION PROCESSED NOISE PATTERN

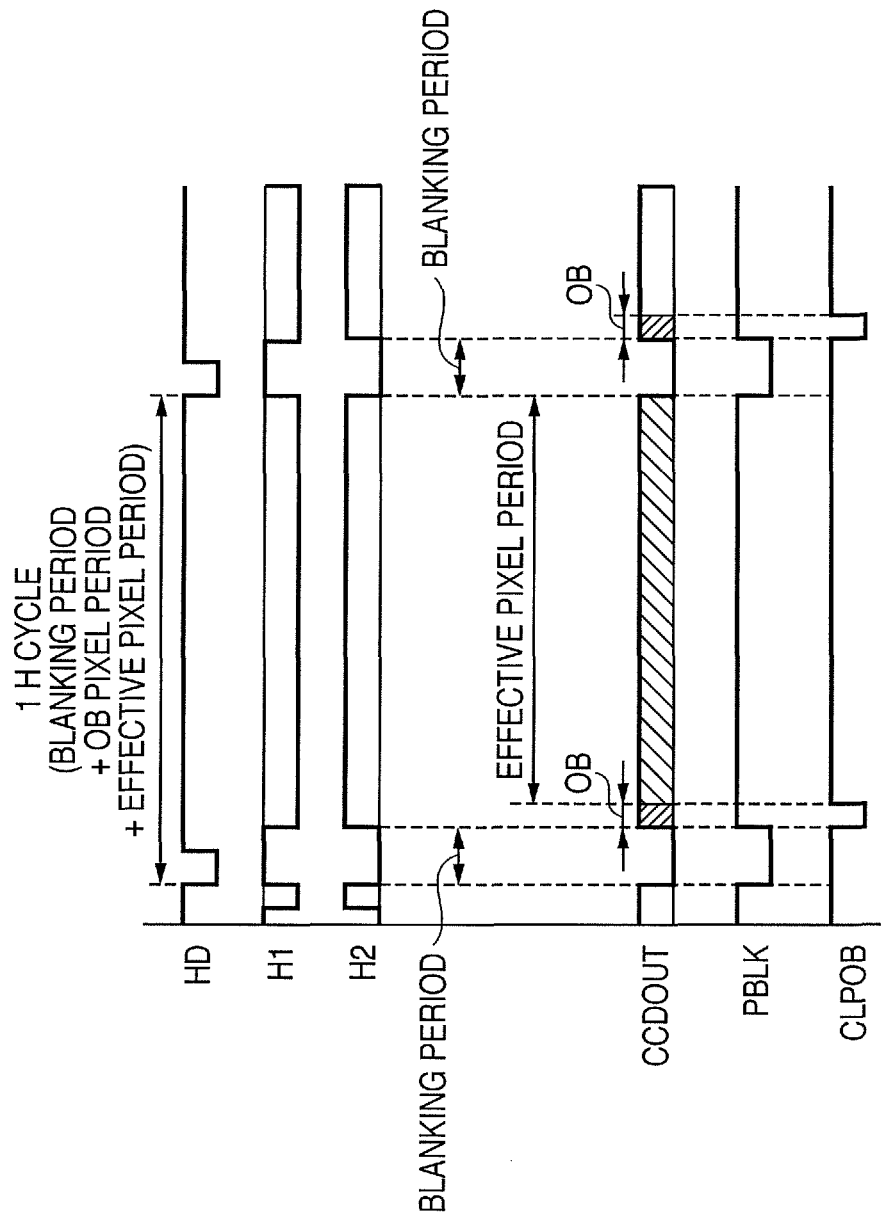

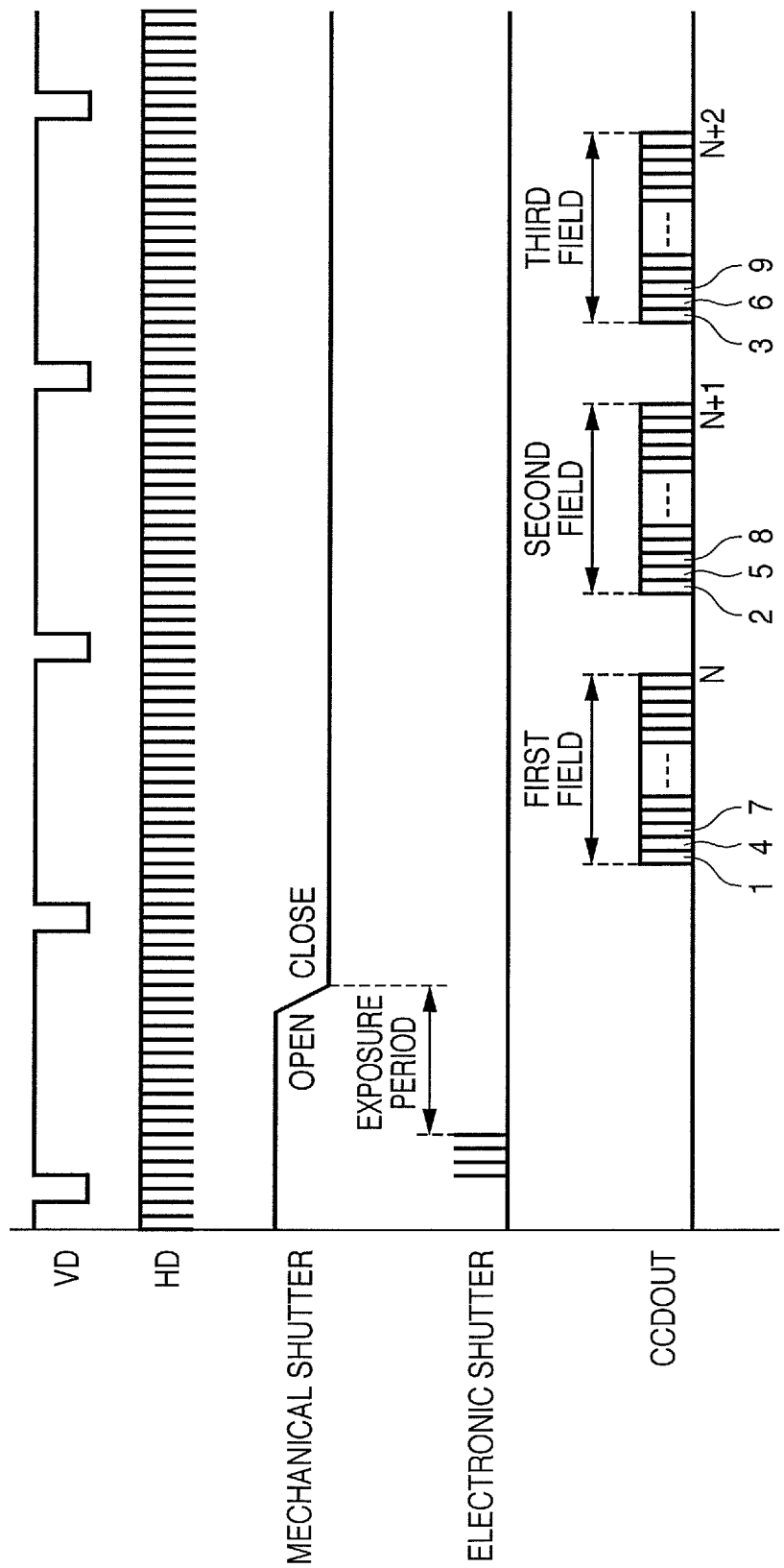

FIG. 21A BACKGROUND ART

DARK IMAGE LEADING BY 1 PHASE

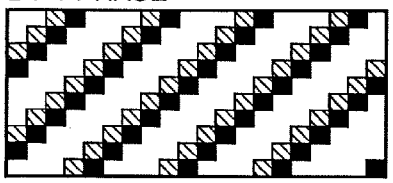

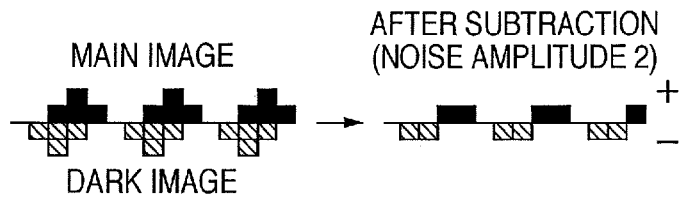

MAIN IMAGE

AFTER SUBTRACTION (NOISE AMPLITUDE 2)

DARK IMAGE

FIG. 21B BACKGROUND ART

NO PHASE DIFFERENCE

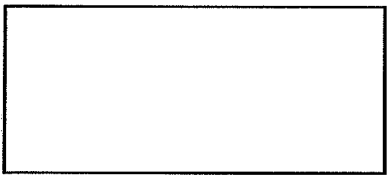

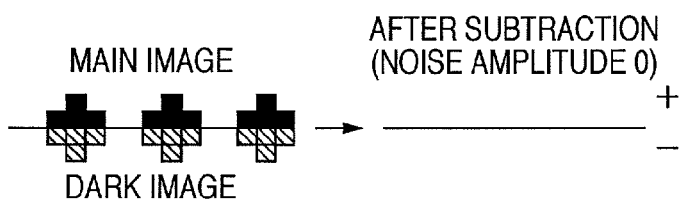

MAIN IMAGE

AFTER SUBTRACTION (NOISE AMPLITUDE 0)

DARK IMAGE

FIG. 21C BACKGROUND ART

DARK IMAGE LAGGING BY 1 PHASE

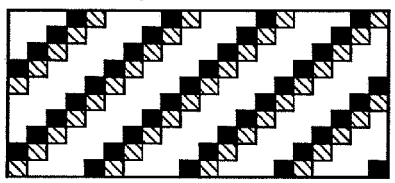

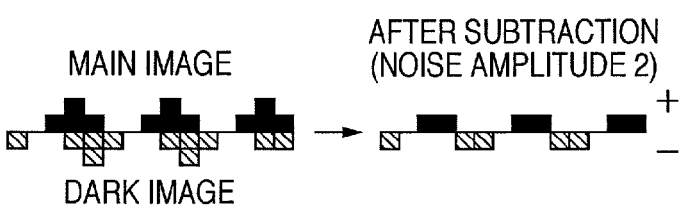

MAIN IMAGE

AFTER SUBTRACTION (NOISE AMPLITUDE 2)

DARK IMAGE

FIG. 21D BACKGROUND ART

DARK IMAGE LAGGING BY 2 PHASES

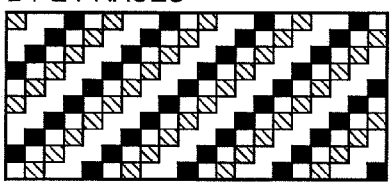

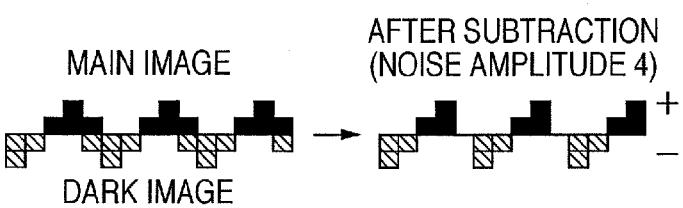

MAIN IMAGE

AFTER SUBTRACTION (NOISE AMPLITUDE 4)

DARK IMAGE

FIG. 21E BACKGROUND ART

DARK IMAGE LEADING BY 2 PHASES

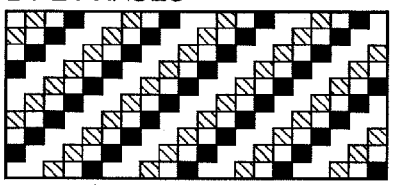

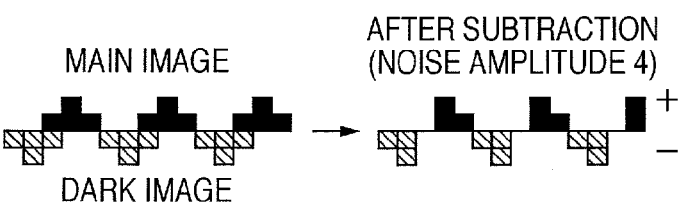

MAIN IMAGE

AFTER SUBTRACTION (NOISE AMPLITUDE 4)

DARK IMAGE

IMAGE SENSING APPARATUS AND METHOD WITH DRIVE CONTROL VARIATION OF EACH OF THE PLURALITY OF OUTPUT FIELDS

CROSS-REFERENCE TO RELATED APPLICATION

This application is a continuation of application Ser. No. 11/925,155, filed Oct. 26, 2007, the entire disclosure of which is hereby incorporated by reference.

BACKGROUND OF THE INVENTION

1. Field of the Invention

The present invention relates to an image sensing apparatus and a control method therefor, and more particularly, to an image sensing apparatus that senses an object using a solid-state image sensing element such as a CCD, and a control method therefor.

2. Description of the Related Art

In recent years, a wide variety of image sensing apparatuses such as digital cameras and the like, which use a memory card having a solid-state memory element as a recording medium and record and reproduce images sensed with a solid-state image sensing element such as a CCD, have been developed and come into widespread use. At the same time, improved resolution and operating speed with respect to the sensing of still images and moving images in such image sensing apparatuses are sought. Consequently, increasing the frequencies of drive signals for driving the image sensing element and the driving frequencies for analog signal processing circuits, A/D converters, and later-stage digital signal processing circuits that constitute the digital cameras or the like is advancing rapidly.

Moreover, recently, in addition to improving picture quality in terms of providing high picture quality and fine definition, even greater demands are being made for a type of convenience in which almost error-free image sensing in a variety of image sensing scenes is possible. As a result, in order to track fast-moving objects such as in sports scenes, for example, or in an attempt to prevent hand-shake in indoor image sensing under low light, shutter speeds are being increased. Further, to enable image sensing in locations where flash photography is prohibited, such as art museums and aquariums, even greater sensitivity of the image sensing element is sought.

Below, a description is given of an example of a conventional digital camera.

FIG. 13 is a block diagram showing schematically an image sensing part inside a typical digital camera.

In FIG. 13, reference numeral 501 designates an image sensing element such as a CCD or a CMOS sensor (hereinafter "CCD"). Reference numeral 502 designates an image sensing circuit that processes output signals from the CCD 501, and 503 designates an A/D converter for converting processed analog image signals into digital image signals. It should be noted that the area inside the frame designated by reference numeral 500 indicates an analog signal processing part. In addition, reference numeral 504 is a digital signal processor that performs various types of signal processing, for the purpose of recording digitally converted image signals on a recording medium, displaying the signals on a liquid crystal display screen, and so forth. Reference numeral 505 designates an oscillation circuit (OSC1), 506 designates a timing generator (TG), 507 designates a sync signal generator (SSG), and 508 designates an oscillation circuit (OSC2).

Reference numeral 509 designates a system controller that includes a CPU for controlling the overall operation of the digital camera.

The OSC1 (505) supplies the operating clocks for the timing generator 506 and the OSC2 (508) supplies the operating clocks for the system controller 509. The timing generator 506 supplies the operating clocks (TGCLK) for the sync signal generator 507. The sync signal generator 507 counts a predetermined number of operating clocks and generates horizontal sync signals (HD) and vertical sync signals (VD) that it then supplies to the timing generator 506. The timing generator 506 synchronizes to the horizontal sync signals (HD) and the vertical sync signals (VD) supplied from the sync signal generator 507 and supplies various drive signals to the CCD 501. In addition, the timing generator 506 supplies sampling clock signals to the image sensing circuit 502, the A/D converter 503, and the digital signal processor 504, respectively. The system controller 509 sets generation or not of the horizontal sync signals (HD) and the vertical sync signals (VD) and their cycles for the sync signal generator 507, and also controls the operation of the digital signal processor 504.

FIG. 14 shows schematically a configuration of the CCD 501 shown in FIG. 13. In FIG. 14, reference numeral 1 designates photoelectric converter elements and 2 designates vertical transfer CCD (VCCD). It should be noted that, of the photoelectric converter elements 1, the photoelectric converter elements 1 indicated by the shading of the leftmost column are light-shielded photoelectric converter elements (shielded part). The other photoelectric converter elements 1 are photoelectric converter elements in an effective pixel area that is not shielded from light. Each photoelectric converter element 1 and each VCCD 2 form a pair, with multiple pairs arranged two-dimensionally to form an image sensing area that senses an image by converting light rays from an object into electrical charges. Reference numeral 4 designates horizontal transfer CCD (HCCD) that transfer electrical charges transferred sequentially from the VCCD 2 in a horizontal direction.

The electrical charges generated at the photoelectric converter elements 1 are transferred to the VCCD 2, after which they are transferred sequentially in a vertical direction toward the HCCD 4, in units of lines in the horizontal direction. Thereafter, the electrical charges are transferred in the horizontal direction by the HCCD 4, converted from charges to voltages by a charge-voltage converter amp 5, and output.

It should be noted that, in reality, there are many more of the VCCD 2, the HCCD 4, the effective pixel area photoelectric converter elements 1 and the light-shielded photoelectric converter elements 1 that comprise the CCD 501 than are shown in FIG. 14. Thus, for example, although in FIG. 14 the light-shielded photoelectric converter elements in the shielded part at a left end of the CCD 501 are shown as a single column, in reality the light-shielded photoelectric converter elements are comprised of multiple columns.

FIG. 15 is a block diagram showing the circuit configuration inside the image sensing circuit 502 in greater detail.

In FIG. 15, the image sensing circuit 502 is comprised of a correlated double sampling (CDS) circuit 600, an amplifier 601, and a clamping circuit 602.

Usually, in a later stage of the CCD sensor, there is a CDS circuit that reduces a reset noise component arising during charge transfer in the CCD. The output of the CCD 501 is comprised of a field through period, which becomes a signal level reference for each pixel during one horizontal transfer cycle, and an image signal period, in which an image signal is output in proportion to the light exposure. The CDS circuit 600 is a noise reduction circuit that obtains a difference between the field through period signal level and the image signal period signal level from the output signals from the CCD 501, and removes a correlative noise component of one pixel cycle from the image signal. The amplifier 601 amplifies image signals output through the CDS circuit 600 to a predetermined signal level to match an input range of the later-stage A/D converter 503, and supplies the amplified signals to the clamping circuit 602. The clamping circuit 602 adjusts a DC voltage level so that charges output from pixels in the shielded part attain a predetermined black reference value. It should be noted that a period in which charges from pixels in the shielded part are output within the image signal period is called an optical black (OB) period.

FIG. 16 shows a timing chart showing the main signals for driving the digital camera shown in FIGS. 13 through 15.

In this example, the OSC1 (505) operating clock frequency is 33.75 MHz and the oscillation circuit 506 operating clock frequency is 27 MHz.

The operating frequency of each pixel output from the CCD 501 is determined by CCD drive signals generated by the timing generator 506, and is generated from the same 33.75 MHz frequency as the OSC1 (505) operating clock. In other words, one pixel period of CCD output signal at this time is 29.6 ns, (=1/33.75 MHz). The field through period and the image signal period described above are contained in one period of the operating clock.

Further, the timing generator 506 generates, in sync with the CCD drive signal, a sample-and-hold S/H pulse (SH1) that samples and holds the signal level of the field through period at each pixel and a sample-and-hold S/H pulse (SH2) that samples and holds the signal level of the image signal period.

An increase in the speed of the driving frequency of the image sensing elements in the image sensing apparatus can be one major cause of deterioration of an S/N ratio of the image signals. Leakage of unnecessary clock signals into analog image signals occurs particularly easily inside digital image sensing apparatuses, which are driven by a plurality of operating clock signals and in which analog signals and digital signals are mixed together. Unnecessary clock signals leaking into the analog signals are superimposed on the generated image at a fixed pitch as interference clock noise. Moreover, since the signals are of fixed pitch, the leaking clock signals are often noticeable even though they are at a smaller level than the level of random noise such as the thermal noise of the CCD sensor and circuits.

In addition, this type of deterioration in the S/N ratio of the image signal surfaces all the more readily the higher the sensitivity settings of the image sensing apparatus and the greater the degree of amplification of the image signals of the image sensing circuit.

For example, in the configuration shown in FIG. 13, as the system operating speed is increased and the image sensing signal driving frequency is increased, the S/H pulses (SH1, SH2) and the A/D converter 503 sampling clock (ADCLK) have also increased in speed. As a result, it becomes increasingly difficult to avoid these clock noise components (system clock components) leaking into the image signals of the analog signal processing area 500 by adjusting the timing.

Here, a description is given of a case in which the output of the CCD 501 is subjected to sampling by the A/D converter 503 sampling clock (ADCLK) and the S/H pulses (SH1, SH2) with a pixel clock frequency of 33.75 MHz. If the above-described system clock components (27 MHz) leak into image signals in the analog signal processing area 500, then 6.75 MHz of cyclical noise, which is the difference between the frequency components (=33.75−27 MHz), remains in the post-sampling image data as a result. This is one fifth the frequency of the 33.75 MHz CCD 501 drive pulse, or in other words fixed pitch noise of 5 pixel cycles. The fixed pitch noise created by this pulse interference, although it depends also on the pitch size, is easily distinguishable compared to the random noise such as the thermal noise of the CCD sensor and image sensing circuit, and therefore tends to be especially noticeable.

In the case of the CCD sensor, a rough breakdown of a single horizontal (1 H) period is as shown in FIG. 17. Specifically, the horizontal period is composed of a blanking period, in which HCCD 4 transfer drive pulses H1, H2 are stopped, and a pixel readout period in which HCCD 4 transfer drive pulses H1, H2 are driven (OB period+effective pixel period).

The fixed pitch noise superimposed one-dimensionally on the image signals, with respect to a two-dimensional image rendered horizontally and vertically by the CCD area sensor or the like, changes appearance depending on the number of pixel clocks that comprise a single horizontal period.

In the case of fixed pitch noise of 5 pixel cycles, as shown in FIGS. 18A through 18E, the noise pattern formed has five variations according to cosets of 5 according to the number of pixel clocks that comprise a single horizontal period. As can be seen from FIGS. 18A through 18E, although there is no change in the noise pitch in the horizontal direction, the way in which the noise shows up changes somewhat because the angle of the noise pattern on the rendered two-dimensional image changes.

However, in an interline-type solid-state CCD, there is an output method in which the electrical charges of all the pixels are read out in n portions, that is, a single frame is divided into n fields and output.

FIG. 19 shows a timing chart illustrating the timing of an image sensing operation when outputting the charges of all the pixels (a single frame) in three fields, in an image sensing apparatus using the interline-type CCD described above.

In FIG. 19, VD is a vertical sync signal and HD is a horizontal sync signal. In a mechanical shutter, exposure is controlled by mechanically opening and closing the mechanical shutter. In an electronic shutter, the exposure is controlled by applying a pulse to the CCD 501 substrate potential and pulling the pixel charges toward the substrate (resetting). A time period from completion of resetting of the pixel charges by the electronic shutter to closing of the mechanical shutter is an exposure period. In addition, a time period from the completion of the resetting of the pixel charges by the electronic shutter to output of the pixel charges of the photoelectric converter elements 1 to the VCCD 2 is a charge accumulation period.

The CCD 501 output operation, after completion of exposure by the mechanical shutter, is divided three times by a plurality of vertical transfer pulses, not shown, applied to the CCD 501 from the timing generator 506, with only charges of pixels of certain horizontal lines, each different, output to the VCCD 2. Therefore, the readout of a single frame constructed of N lines would be output as follows:

(1) In an initial vertical sync period, output charges from pixels of lines corresponding to lines 1, 4, 7 . . . N−2 as a first field;

(2) in a succeeding vertical sync period, output charges from pixels of lines corresponding to lines 2, 5, 8 . . . N−1 as a second field; and (3) in a another succeeding vertical sync period, output charges from pixels of lines corresponding to lines 3, 6, 9 . . . N as a third field.

In an image sensing apparatus using an interline-type solid-state image sensing element like that described above, the above-described fixed pitch noise of 5 pixel cycles superimposed one-dimensionally on the image signals develops into noise patterns like those shown in FIGS. 20A and 20B on the two-dimensional image during readout of all the pixels. The noise patterns shown in FIGS. 20A and 20B are combinations of the noise patterns shown in FIG. 18B, combining three fields to make up a single frame. In both FIG. 20A and FIG. 20B cyclical features of the noise patterns of each of the fields are emphasized, resulting in heightened visibility.

If the phase relation can be accurately controlled so that cyclic noise pixels on adjacent lines between the fields are skillfully dispersed, then it would seem to be possible to wipe out the cyclical features of the noise patterns of each of the fields and construct a frame image in which the noise pattern is difficult to identify.

However, in most cases, the OSC1 (505) operating clock (33.75 MHz) and the OSC2 (508) operating clock (27 MHz) shown in FIG. 13 are configured with mutually independent oscillation circuits. In the case of a free run, the phases of the noise patterns of the fields move depending on accuracy and temperature drift of the respective oscillation circuits. Consequently, when producing one frame image from three field images, the noise patterns are sometimes easily noticeable and sometimes hardly noticeable, and this wide variation poses a problem.

It is also possible to generate the OSC1 (505) operating clock (33.75 MHz) from, for example, the OSC2 (508) operating clock (27 MHz) with a method that uses a phase locked loop (PLL) circuit or the like. In this case, the noise pattern and phase relation between fields can be determined accurately, and therefore the frame image noise pattern can be controlled. However, in such case the OSC2 (508) operating clock (27 MHz) must be taken through the PLL circuit to the timing generator 506 and near the analog signal processing area 500 that is so susceptible to noise, thereby increasing the risk of substantial leakage of the system operating clock (27 MHz) into the analog image signals.

On the other hand, when using a solid-state image sensing element such as a CCD, ordinarily dark noise correction is carried out. Dark noise correction is a calculation process carried out using main image data, which is read out after carrying out electrical charge accumulation in a state in which the image sensing elements are exposed, and dark image data, which is similarly read out after carrying out electrical charge accumulation but in a state in which the image sensing elements are not exposed. Dark noise correction can correct the sensed image data with regard to picture quality degradation due to dark current noise generated by the image sensing elements, pixel loss due to minute scratches unique to image sensing elements, or the like to achieve high-quality image sensing.

In particular, because dark current noise increases with charge accumulation period and image sensing element temperature increase, dark noise correction can obtain substantial picture quality improvement when conducting long time exposure or high-temperature exposure.

In an image sensing apparatus that carries out such dark noise correction processing, the fixed pitch noise of 5 pixel cycles superimposed on the image signals as described above develops into noise patterns like those shown in FIGS. 21A-21E on the image after dark noise correction processing.

The noise patterns shown in FIGS. 21A-21E are examples of dark noise correction processing (in this case subtraction) carried out on both main image data and dark image data, when one horizontal period is composed of 5N+1 pixel clocks as shown in FIG. 18B.

As shown in FIGS. 21A-21E, five noise patterns of from FIG. 21A to FIG. 21E are generated in the image after dark noise correction processing due to a phase difference between the main image data and the dark image data.

FIGS. 21A-21E together create an approximate distribution state in which the cyclical noise level before the dark noise correction processing is 2 at the center pixels and 1 at the adjacent pixels, and show schematically a state in which the noise level after dark noise correction processing changes due to the noise pattern phase difference with the dark image.

For the five noise patterns, the way in which the noise shows up may be divided into three cases, specifically:

(1) cases in which the noise is less noticeable compared to the main image (phase difference 1, FIG. 21A and FIG. 21C);

(2) cases in which the noise is very noticeable compared to the main image (phase difference 2, FIG. 21D and FIG. 21E); and (3) cases in which noise is not at all noticeable compared to the main image (phase difference 0, FIG. 21B).

If the phase relation can be accurately controlled so that cyclic noise pixels on the main image and the dark image are skillfully made to cancel each other out, then it would seem to be possible ultimately to produce an image that is free of cyclical noise.

However, in most cases, the OSC1 (505) operating clock (33.75 MHz) and the OSC2 (508) operating clock (27 MHz) shown in FIG. 13 are configured with mutually independent oscillation circuits. In the case of a free run, the phases of the noise patterns of the main image and the dark image move depending on the accuracy and the temperature drift of the respective oscillation circuits, and it is very difficult to control the phase relation accurately.

It is also possible to generate the OSC1 (505) operating clock (33.75 MHz) from, for example, the OSC2 (508) operating clock (27 MHz) with a method that uses a phase locked loop (PLL) circuit or the like. In this case, the noise pattern and phase relation between frame fields can be determined accurately, and therefore the noise pattern after dark noise correction processing can be controlled. However, in such case the OSC2 (508) operating clock (27 MHz) must be taken through the PLL circuit to the timing generator 506 and near the analog signal processing area 500 that is so susceptible to noise, thereby increasing the risk of substantial leakage of the system operating clock (27 MHz) into the analog image signals.

In Japanese Patent Application Laid-Open 2001-285726 a technology for reducing unneeded beat noise generated when applying frequency dispersion means to analog signal processing in an image sensing apparatus is disclosed. According to this technology, superimposing beat noise that responds cyclically to frequency dispersion onto the image signals using the frequency dispersion means is suggested. Then, in a horizontal transfer blank period of the image sensing elements the phase of the frequency dispersion part is randomly reset to achieve a reduction in beat noise.

However, in a digital camera that does not have a frequency dispersion means like that shown in FIG. 13, unnecessary cyclical noise generated outside the frequency dispersion means cannot be reduced with the method of Japanese Patent Application Laid-Open 2001-285726.

SUMMARY OF THE INVENTION

The present invention has been made in consideration of the above situation, and has as its object to make cyclical noise in a sensed image hardly noticeable without complicating a configuration of an image sensing apparatus.

According to the present invention, the foregoing object is obtained by providing an image sensing apparatus comprising:

an image sensing unit configured to carry out image sensing by converting incoming light into electrical signals;

a control unit configured to control driving of the image sensing unit to output the electrical signals by each area of a plurality of areas of the image sensing unit; and a signal processing unit configured to process the electrical signals output by each area of the plurality of areas, the control unit, for the each area of the plurality of areas, varying a horizontal cycle that drives the image sensing unit.

According to another aspect of the present invention, a control method for an image sensing apparatus having an image sensing unit configured to carry out image sensing by converting incoming light into electrical signals, the control method comprising:

a first setting step that sets a horizontal cycle that drives the image sensing unit to a first cycle;

a first image sensing step that carries out an image sensing operation in the first cycle and obtains a first image signal from a first area of the image sensing unit;

a second setting step that sets a horizontal cycle that drives the image sensing unit to a second cycle different from the first cycle;

a second image sensing step that carries out an image sensing operation in the second cycle and obtains a second image signal from a second area of the image sensing unit different from the first area of the image sensing unit; and a signal processing step that processes the first image signal and the second image signal.

According to still another aspect of the present invention, an image sensing apparatus comprising:

an image sensing unit configured to carry out image sensing by converting incoming light into electrical signals;

a control unit configured to control a first image sensing operation that carries out image sensing under conditions in which the image sensing unit is exposed and a second image sensing operation that carries out image sensing under conditions in which the image sensing unit is not exposed; and a signal processing unit configured to process the first image signal with the second image signal, the control unit varying a horizontal cycle that drives the image sensing unit between the first image sensing operation and the second image sensing operation.

According to yet another aspect of the present invention, a control method for an image sensing apparatus having an image sensing unit configured to carry out image sensing by converting incoming light into electrical signals, the control method comprising:

a first setting step that sets a horizontal cycle that drives the image sensing unit to a first cycle;

a first image sensing step that carries out an image sensing operation in the first cycle under conditions in which the image sensing unit is exposed and obtains a first image signal;

a second setting step that sets a horizontal cycle that drives the image sensing unit to a second cycle different from the first cycle;

a second image sensing step that carries out an image sensing operation in the second cycle under conditions in which the image sensing unit is not exposed and obtains a second image signal; and a processing step that processes the first image signal with the second image signal.

Further features of the present invention will become apparent from the following description of exemplary embodiments (with reference to the attached drawings).

BRIEF DESCRIPTION OF THE DRAWINGS

FIGS. 6A through 6D are diagrams illustrating noise patterns in the first embodiment of the present invention;

FIGS. 7A through 7C are timing charts illustrating changes in horizontal cycle in a second embodiment of the present invention;

FIG. 9 is a timing chart illustrating still image readout in the third embodiment of the present invention;

FIGS. 10A and 10B are timing charts illustrating changes in horizontal cycle in the third embodiment of the present invention;

FIGS. 11A through 11C are diagrams illustrating noise patterns in the third embodiment of the present invention;

FIG. 17 is a timing chart illustrating a conventional single horizontal period configuration;

FIG. 19 is a timing chart illustrating a conventional image sensing operation during field readout;

FIGS. 21A through 21E are diagrams showing examples of noise patterns after dark noise correction processing.

DESCRIPTION OF THE EMBODIMENTS

Preferred embodiments of the present invention will be described in detail in accordance with the accompanying drawings.

Figure 1:
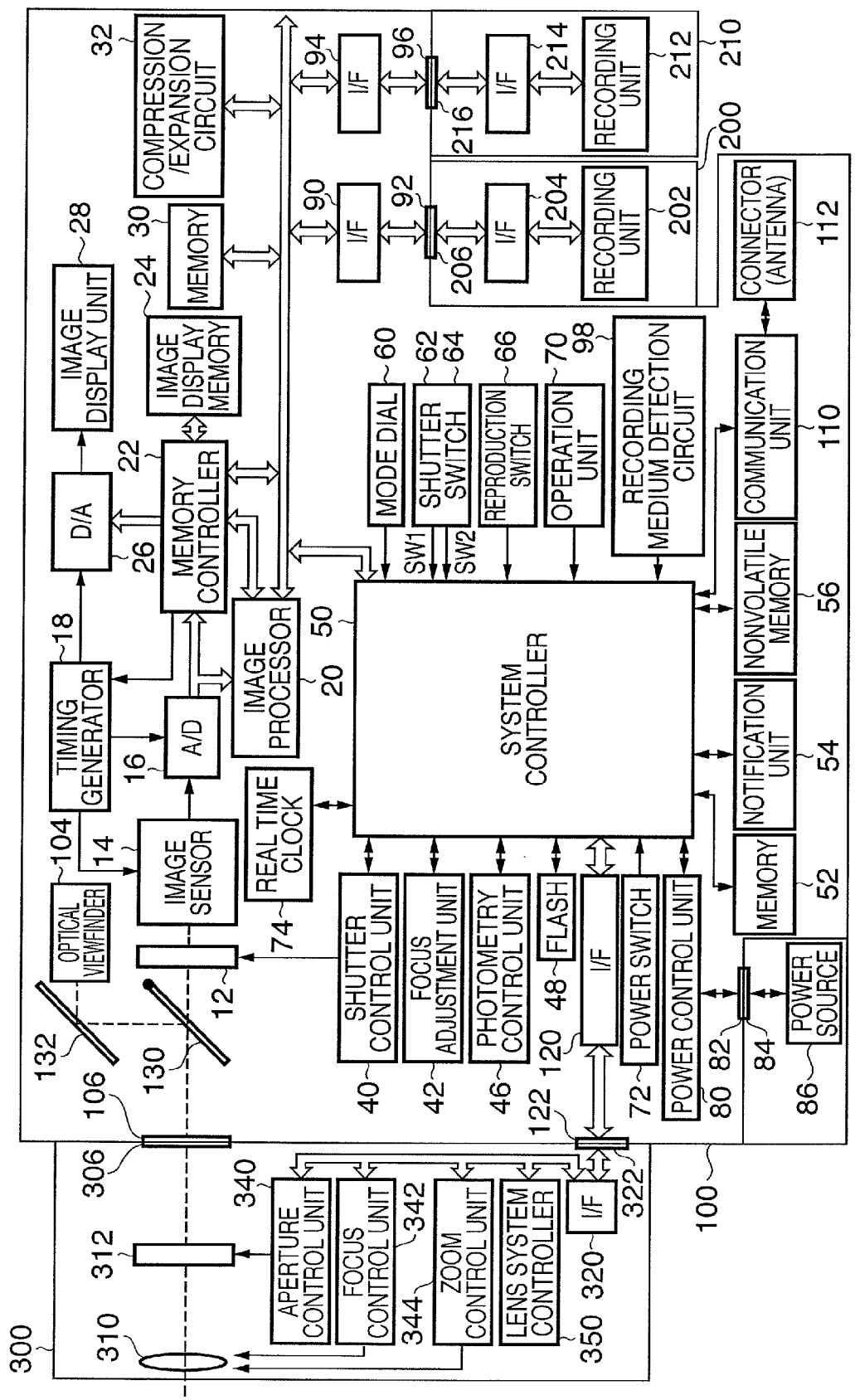
FIG. 1 is a block diagram showing a configuration of an image sensing apparatus according to embodiments of the present invention.

FIG. 1 is a block diagram showing a configuration of an image sensing apparatus having an image processing capability in embodiments of the present invention. In the embodiments, a description is given of an example in which a digital camera is used as the image sensing apparatus. It should be noted that, as image sensing apparatuses, there are also digital video cameras, camera-equipped mobile terminals (including camera-equipped mobile phones), scanners, and so forth. Thus, the present invention is applicable to anything capable of converting an object optical image and outputting electrical image signals.

As shown in FIG. 1, the image sensing apparatus of the present embodiment is comprised mainly of a camera main unit 100 and an interchangeable lens-type lens unit 300.

In the lens unit 300, reference numeral 310 designates an image sensing lens composed of multiple lenses, 312 designates an aperture, and 306 designates a lens mount that mechanically joins the lens unit 300 to the camera main unit 100. Inside the lens mount 306 are contained a variety of functions that connect the lens unit 300 electrically to the camera main unit 100. Reference numeral 320 designates an interface in the lens mount 306 for connecting the lens unit 300 to the camera main unit 100, and 322 designates a connector that electrically connects the lens unit 300 to the camera main unit 100.

The connector 322 is provided with functions for transmitting control signals, status signals, data signals and the like between the camera main unit 100 and the lens unit 300, as well as for supplying or for being supplied with a variety of voltages and currents. In addition, the connector 322 may be configured not just for propagating electronic communication but also for fiber-optic communication, audio communication, and the like.

Reference numeral 340 designates an aperture control unit that controls the aperture 312 in conjunction with a shutter control unit 40 that controls a shutter 12 of the camera main unit 100 described later based on photometric information from a photometry control unit 46. Reference numeral 342 designates a focus control unit that controls focusing of the image sensing lens 310, and 344 designates a zoom control unit that controls zooming of the image sensing lens 310.

Reference numeral 350 designates a lens system controller that controls the lens unit 300 as a whole. The lens system controller 350 is provided with a memory to store variables, constants, programs and the like needed for operation. Further, the lens system controller 350 is also provided with a nonvolatile memory that saves such identifying information as a number or the like unique to the lens unit 300; control information; function information such as release aperture value and minimum aperture value, focal distance, and the like; and past and present settings and the like.

Next, a description is given of the configuration of the camera main unit 100.

Figure 14:
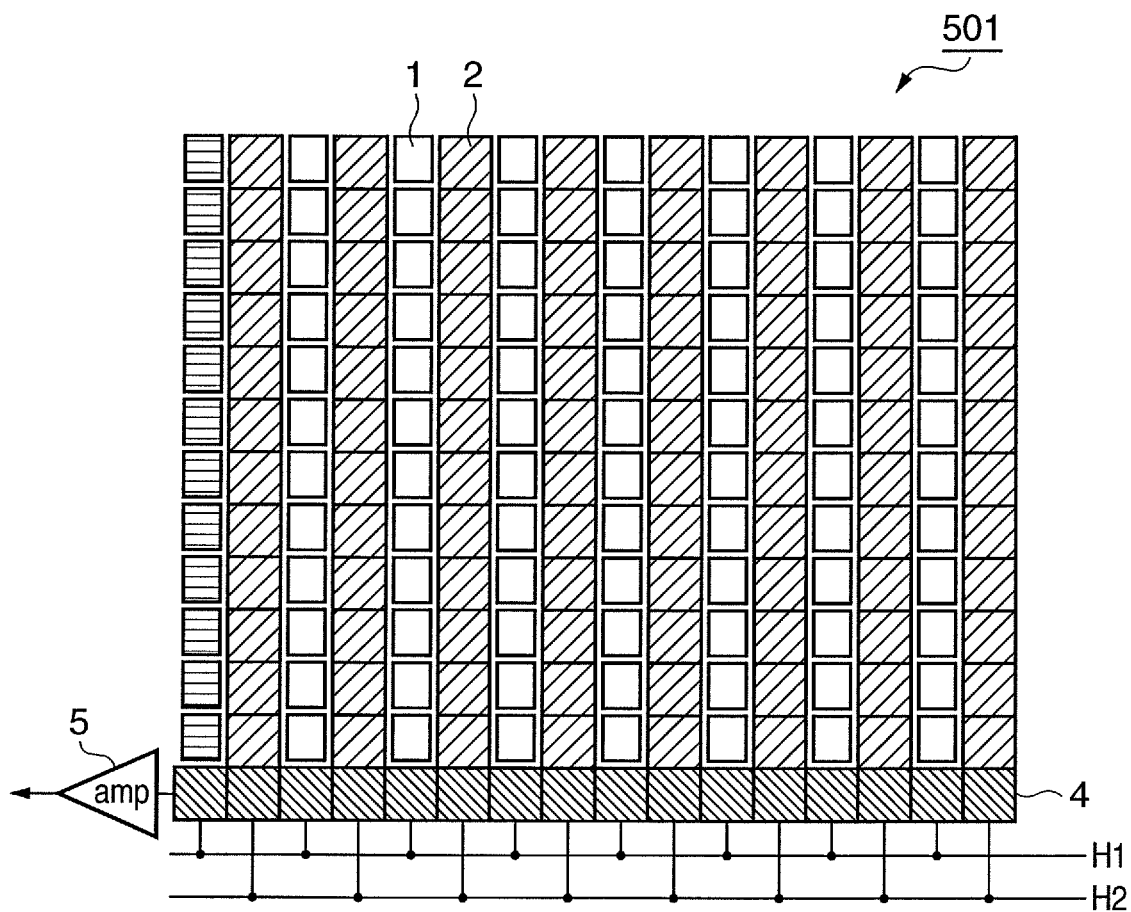
FIG. 14 shows schematically a configuration of an image sensing element.
Figure 15:
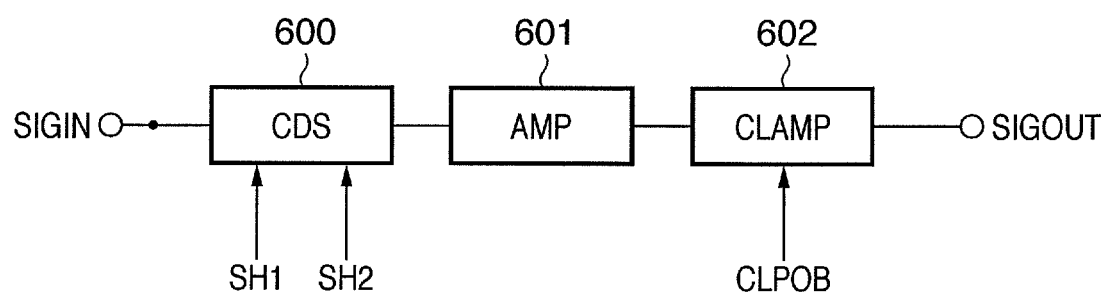
FIG. 15 is a block diagram showing in detail the configuration of an image sensing circuit 502 shown in FIG. 13.
Figure 16:
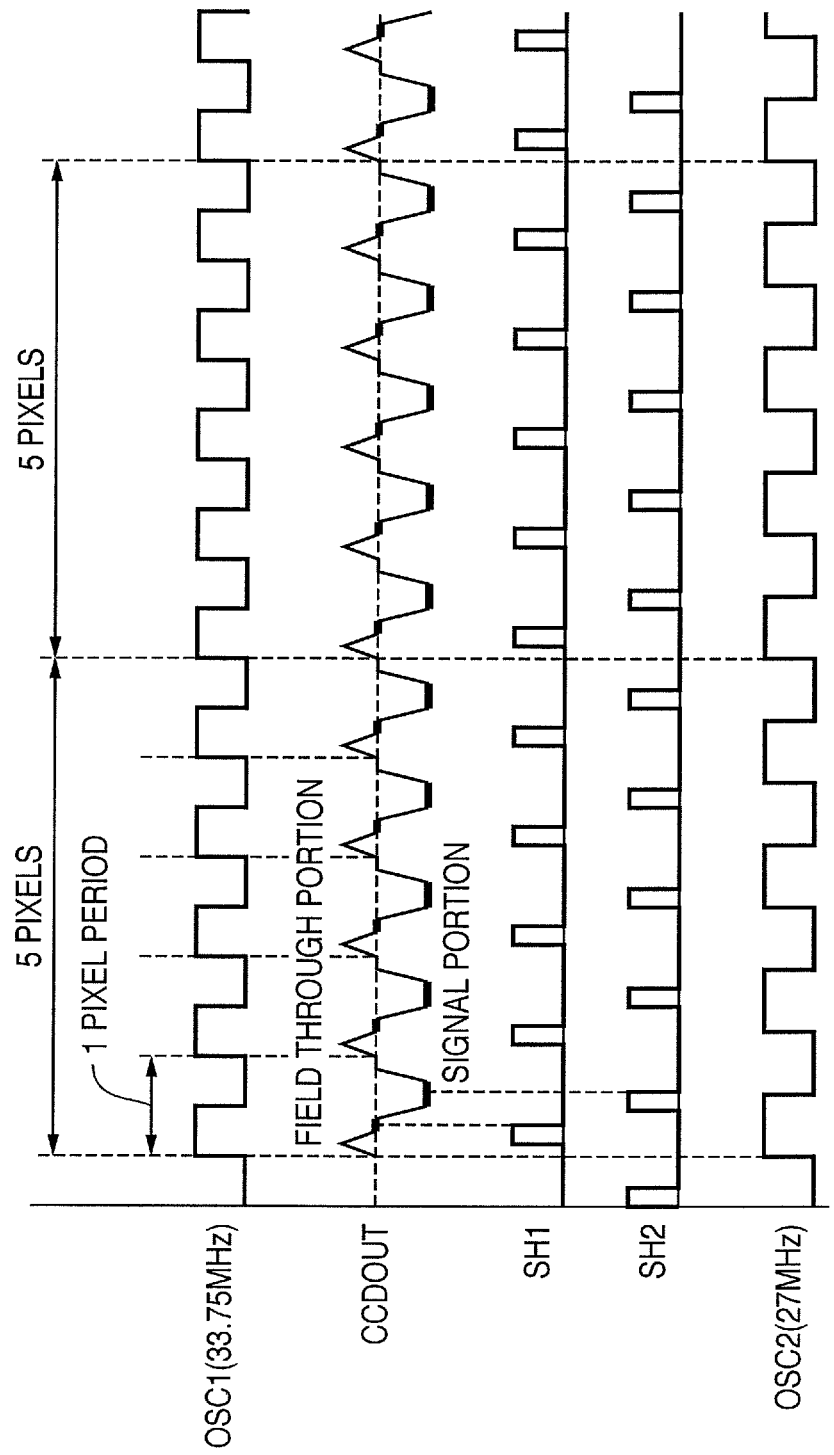
FIG. 16 is a timing chart showing operation of the conventional digital camera.
Figure 18A:
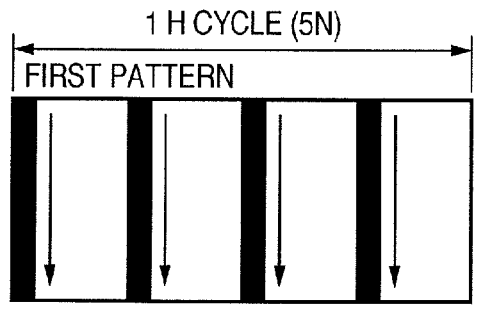
FIGS. 18A through 18E are diagrams showing examples of noise patterns.
Figure 18B:
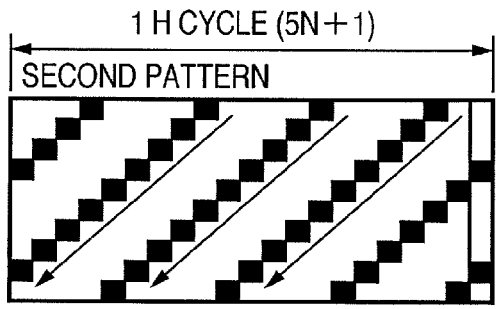
Figure 18C:
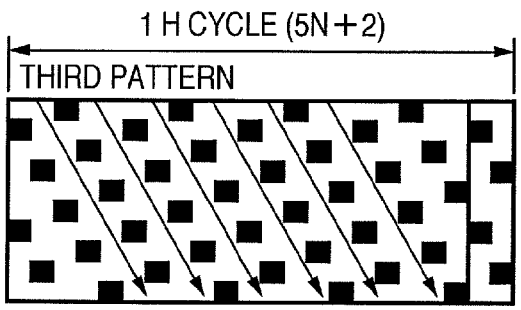
Figure 18D:
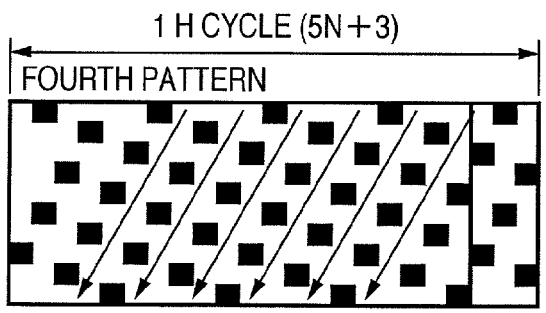
Figure 18E:
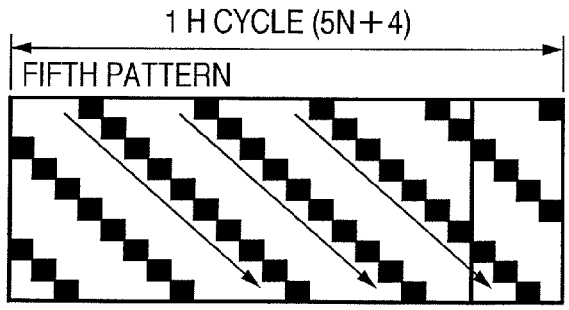
Figures 20A, 20B:
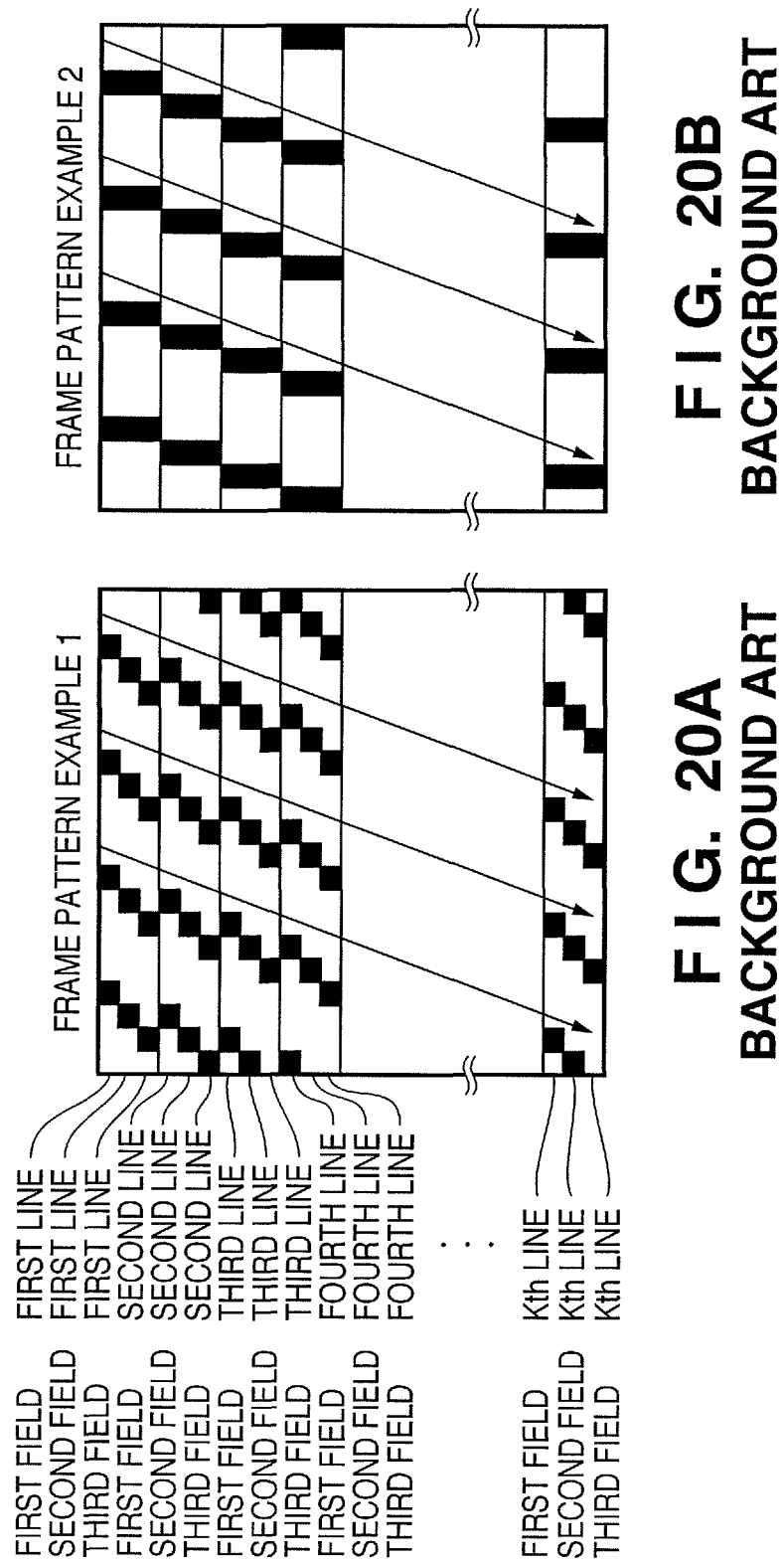
FIGS. 20A and 20B are diagrams showing examples of noise patterns, in a case in which three fields of combinations of the noise patterns shown in FIG. 18B are combined to form a single frame.

Reference numeral 106 designates a lens mount that mechanically joins the camera main unit 100 and the lens unit 300, and 130 and 132 designate mirrors that direct incoming light rays through the image sensing lens 310 to an optical viewfinder 104 in a single-lens-reflex system. It should be noted that the mirror 130 may be constructed as either a quick return mirror or a half mirror. Reference numeral 12 designates the shutter, provided with an aperture function, and 14 designates an image sensor that converts optical images into electrical signals. The present embodiment has as the image sensor 14 an interline-type CCD solid-state image sensing element having the same configuration as the CCD 501 described above with reference to FIG. 14. The charges of all the pixels are read out in n portions, that is, a single frame is divided into n fields and read out. Light rays incoming through the image sensing lens 310 are directed by the single-lens-reflex system to the aperture 312 that acts as a light amount limitation unit and through the lens mounts 306 and 106, the mirror 130, and the shutter 12, to be focused on the image sensor 14 as an optical image.

Reference numeral 16 designates an A/D converter that converts analog signals output from the image sensor 14 into digital signals. The image sensor 14 and the A/D converter 16 form an area that processes analog signals. Reference numeral 18 designates a timing generator that supplies clock signals and control signals to each of the image sensor 14, the A/D converter 16 and a D/A converter 26. The timing generator 18 is controlled by a memory controller 22 and a system controller 50.

Reference numeral 20 designates an image processor 20 that performs predetermined pixel interpolation and color conversion on data output from the A/D converter 16 or from the memory controller 22. In addition, the image processor 20 performs certain calculations using image data output from the A/D converter 16. Then, based on the calculation results obtained, the system controller 50 carries out TTL (through-the-lens) auto-focus (AF), auto-exposure (AE), and pre-flash (EF) processing for controlling the shutter control unit 40 and a focus adjustment unit 42. Further, the image processor 20 carries out certain calculations using image data output from the A/D converter 16, and also carries out TTL auto white balance (AWB) processing based on the calculation results thus obtained.

It should be noted that the example of the present embodiment shown in FIG. 1 is provided with a dedicated focus adjustment unit 42 and a dedicated photometry control unit 46. Therefore, the image sensing apparatus may be configured to carry out AF, AE and EF processing using the focus adjustment unit 42 and the photometry control unit 46 and not to carry out AF, AE and EF processing using the image processor 20. Moreover, the image forming apparatus may be configured to carry out AF, AE and EF processing using the focus adjustment unit 42 and the photometry control unit 46 and further to carry out AF, AE and EF processing using the image processor 20.

Reference numeral 22 designates the memory controller 22, which controls the A/D converter 16, the timing generator 18, the image processor 20, an image display memory 24, the D/A converter 26, the memory 30, and a compression/expansion circuit 32. Image data output from the A/D converter 16 is written to the image display memory 24 or to the memory 30 either through the image processor 20 and the memory controller 22 or through the memory controller 22 only.

Reference numeral 24 designates the image display memory, 26 designates the D/A converter, and 28 designates an image display unit composed of a TFT-type LCD or the like, with image data for display written into the image display memory 24 being displayed by the image display unit 28 via the D/A converter 26. By using the image display unit 28 and successively displaying sensed image data, an electronic viewfinder (EVF) function can be implemented. In addition, the image display unit 28 is configured so that display can be turned ON/OFF arbitrarily in accordance with an instruction from the system controller 50. When the display is switched OFF, the power consumption of the camera main unit 100 can be substantially reduced.

Reference numeral 30 designates the memory, which stores sensed still images and sensed moving images. The memory 30 is provided with sufficient storage capacity to store a certain number of still images or a certain amount of time of moving images, thus allowing large numbers of images to be written at high speed to the memory 30 during sequential image sensing or panoramic image sensing, in which multiple still images are sensed in succession. In addition, the memory 30 may also be used as a work area for the system controller 50.

Reference numeral 32 designates the compression/expansion circuit, which compresses or expands image data using any well-known compression method such as adaptive discrete cosine transform (ADCT). The compression/expansion circuit 32 reads images stored in the memory 30, compresses or decompresses them, and once again writes the processed data to the memory 30.

Reference numeral 40 designates the shutter control unit, which controls the shutter 12 in conjunction with the aperture control unit 340 that controls the aperture 312 based on photometric information from the photometry control unit 46. Reference numeral 42 designates the focus adjustment unit that carries out AF (auto focus) processing. The focus adjustment unit 42 detects a state of focus of an image formed as an optical image by directing light rays striking the image sensing lens 310 inside the lens unit 300 through the aperture 312, the lens mounts 306 and 106, and the mirror 130 and a focus adjustment sub-mirror, not shown, via the single-lens-reflex system.

Reference numeral 46 designates the photometry control unit for carrying out AE (auto exposure) processing. The photometry control unit 46 detects a state of exposure of the image formed as an optical image by directing light rays striking the image sensing lens 310 inside the lens unit 300 through the aperture 312, the lens mounts 306 and 106, and the mirror 130 and a focus adjustment sub-mirror, not shown, via the single-lens-reflex system. Reference numeral 48 designates a flash, which also has an auxiliary flash AF function and a flash adjustment function. The photometry control unit 46 works in conjunction with the flash 48, which provides an EF process function as well.

It should be noted that, as described above, exposure control and AF control may also be carried out based on results of calculations performed by the image processor 20 using image data from the A/D converter 16. In that case, the system controller 50 can carry out exposure control and AF control using video TTL method for the shutter control unit 40, the aperture control unit 340 and the focus control unit 342.

In addition, AF control may also be carried out using results of measurements performed by the focus adjustment unit 42 and results of calculations performed by the image processor 20 using image data from the A/D converter 16. Further, exposure control may also be carried out using results of measurements performed by the photometry control unit 46 and the results of calculations performed by the image processor 20 using image data from the A/D converter 16.

Reference numeral 50 designates the system controller 50 that controls the camera main unit 100 as a whole, and has a well-known CPU or the like built in. Reference numeral 52 designates a memory to store variables, constants, programs, and the like for operation of the system controller 50.

Reference numeral 54 designates a notification unit that provides external notification of operating states, messages and so forth using characters, images, sounds and the like in response to execution of a program by the system controller 50. As the notification unit 54 a display unit that carries out visual display by LCD, LED or the like or an audio element that provides notification by sound are used, with the notification unit 54 composed of a combination of one or more of these elements. Particularly in the case of a display unit, the notification unit 54 is located in one or more locations in the vicinity of an operation unit 70 of the camera main unit 100, where it can be seen easily. In addition, some of the functions of the notification unit 54 are located within the optical viewfinder 104.

Of the display contents of the notification unit 54, those which are displayed on the LCD or the like are as follows: First, there are displays relating to image sensing mode, such as single-shot/sequential image sensing display, self-timer display, etc. Then, there are displays relating to recording, such as compression rate display, recording pixel number display, number of recorded images display, display of the remaining number of recordable images, and so forth. Moreover, there are displays relating to image sensing conditions, such as shutter speed display, aperture value (f number) display, exposure compensation display, flash display, red-eye reduction display, and so forth. In addition, there is macro-image sensing display, buzzer-set display, remaining clock battery display, remaining battery display, error display, multi-digit numeric information display, and recording media 200 and 210 status display. Further, attached/detached state display of the lens unit 300, communication I/F operation display, date and time display, display of status of connection with an external computer and the like are also carried out.

In addition, of the display contents of the notification unit 54, as that which is displayed inside the optical viewfinder 104 there is, for example, the following: Focus display, image sensing preparation completed display, hand shake warning display, flash charge display, flash charge completed display, shutter speed display, aperture value (f number) display, exposure compensation display, and recording medium write operation display.

Further, of the display contents of the notification unit 54, as that which is displayed by LED or the like there is, for example, the following: Focus display, image sensing preparation completed display, hand shake warning display, flash charge display, flash charge completed display, recording medium write operation display, macro-image sensing setting notification display, and secondary battery charge display.

In addition, of the display contents of the notification unit 54, as that which is displayed by lights or the like there is, for example, a self-timer notification light or the like. The self-timer notification light may be used as the AF auxiliary lighting.

Reference numeral 56 designates an electrically erasable/programmable nonvolatile memory on which programs and the like, described later, are stored, for which an EEPROM or the like, for example, is used. Various parameters and ISO sensitivity settings are stored in the nonvolatile memory 56.

Reference numerals 60, 62, 64, 66 and 70 designate operating means for inputting various operating instructions to the system controller 50, and are composed of switches and dials, touch panels, a device for pointing using line-of-sight detection, and sound recognition devices, either singly or in combination.

A detailed description is now given of the operating means.

Reference numeral 60 is a mode dial switch. The mode dial switch 60 is a mode switching switch for switching between the start of still image sensing mode and moving image sensing mode operations.

Reference numeral 62 is a shutter switch SW1, which, when turned ON by partial operation (for example, half stroke) of a shutter button, not shown, instructs the start of such operations as AF, AE, AWB and EF processing.

Reference numeral 64 is a shutter switch SW2, which, when turned ON by complete operation (for example, full stroke) of the shutter button, not shown, instructs the start of a series of operations comprised of exposure, development, and recording processing. First, in exposure processing, the signals read out from the image sensor 14 are written to the memory 30 as image data via the A/D converter 16 and the memory controller 22. Then, development processing using calculations performed by the image processor 20 and the memory controller 22 are carried out. Further, in recording processing, the image data is read out from the memory 30 and written as image data to the recording medium 200 or 210 after being compressed by the compression/expansion circuit 32.

Reference numeral 66 is a reproduction switch, which instructs the start of a reproduction operation that reads out images sensed in the image sensing mode state from the memory 30 or from the recording media 200, 210 and displays them on the image display unit 28.

Reference numeral 70 is the operation unit, composed of a variety of buttons and touch panels. As one example, the operation unit 70 includes a menu button, a set button, a macro button, a multi-screen reproduction new page button, a flash set button, a single-shot/sequential image sensing/self-timer switching button, a forward + (plus) menu item selection button, and a backward − (minus) menu item selection button. Further, the operation unit 70 also includes a reproduction image forward + (plus) selection button, a reproduction image backward − (minus) selection button, and a reproduction switch image sensing picture quality selection button capable of setting a variety of function modes such as a reproduction mode, a multi-image reproduction/deletion mode, a PC connection mode and the like. In addition, the operation unit 70 includes an exposure compensation button and a date/time setting button and the like. It should be noted that, with regard to the various functions of the above-described plus buttons and minus buttons, numbers and functions can be selected more easily by providing a rotary dial switch. Moreover, the operation unit 70 includes an ISO sensitivity setting button capable of setting the sensitivity of the ISO by changing the gain setting in the image sensor 14 or the image processor 20.

In addition, there is a selection/switching button that selects and switches among various functions when executing panorama mode (for example) image sensing and reproduction, and a setting/execution button that sets and executes various functions when executing panorama mode (for example) image sensing and reproduction. Moreover, there is an image display ON/OFF switch that sets the image display unit 28 ON/OFF and a quick review ON/OFF switch that sets a quick review function that automatically reproduces sensed image data immediately after image sensing. In addition, there is a compression mode switch for selecting JPEG compression rate or for selecting a CCDRAW mode that digitizes image sensing element signals as is and records them on a recording medium. There is also an AF mode setting switch capable of setting a one-shot AF mode and a servo AF mode. In the one-shot AF mode, an auto focus operation is started when the shutter switch SW1 (62) is pressed, and when once focused that focus is maintained. In the servo AF mode, a continuous auto focus operation is continued while the shutter switch SW1 (62) is pressed.

Reference numeral 72 designates a power switch, capable of switching and setting the camera main unit 100 power ON and power OFF modes. In addition, the power switch 72 can also switch and set in conjunction with the power ON, power OFF settings of the lens unit 300 connected to the camera main unit 100, an external flash, the recording media 200, 210 and various other such accessory devices.

Reference numeral 74 designates a real time clock circuit, by which the system controller 50 measures elapsed time and implements various timer functions.

Reference numeral 80 designates a power control unit, comprised of a battery detection circuit, a DC-DC converter, a switching circuit that switches the block or blocks to be energized, and so forth. The power control unit 80 detects whether or not the battery is installed, the type of battery, and the battery remaining capacity, and controls the DC-DC converter based on the results of that detection and on instructions from the system controller 50 to supply the necessary voltage for the necessary time period to respective parts including the recording media.

Reference numerals 82, 84 designate connectors, and 86 designates a power source comprised of a primary battery, such as an alkaline battery or a lithium battery; a secondary battery, such as a NiCd battery, an NiMH battery, a Li-ion battery, or a Li polymer battery; and an AC adapter and the like.

Reference numerals 90 and 94 designate interfaces for a recording medium such as a memory card or a hard disk, and 92 and 96 designate connectors for connecting to a memory card, a hard disk, or the like. Reference numeral 98 designates a recording medium detection circuit that detects whether or not the recording media 200 and/or 210 are attached to the connectors 92 and/or 96.

It should be noted that, in the present embodiment, an arrangement having two systems of interfaces and connectors for mounting the recording media is described. Alternatively, however, the interfaces and connectors for mounting the recording media may consist of either a single system or multiple systems. Moreover, the interfaces and the connectors may be a combination of interfaces and connectors of different standards.

As the interfaces and connectors, those in conformity with Personal Computer Memory Card International Association standards (PCMCIA cards) and those in conformity with compact flash (CF) (registered trademark) card standards and SD card standards may be used. In a case in which interfaces and connectors in conformity with the PCMCIA standards, CF (registered trademark) card standards and the like are used as the interfaces 90 and 94 and the connectors 92 and 96, various communication cards can be connected such as a LAN card, a modem card, a USB (Universal Serial Bus) card, an IEEE (Institute of Electrical and Electronic Engineers) 1394 card, a P1284 card, an SCSI (Small Computer System Interface) card, and a PHS card. By connecting these various types of communication cards, image data and management information attached to the image data can be transmitted/received with respect to other peripheral devices such as a computer and a printer.

Reference numeral 104 designates the optical viewfinder. With the single-lens-reflex system, light rays striking the image sensing lens 310 are directed toward the optical viewfinder 104 via the aperture 312, the lens mounts 306 and 106, and the mirrors 130 and 132 to form an optical image for display. As a result, the optical viewfinder 104 alone can be used for image sensing without the electronic viewfinder function using the image display unit 28. In the optical finder 104, realized are some of the functions of the notification unit 54 including the indication of the state of focus, the hand shake warning, the flash charge state, the shutter speed, the f number (aperture), the exposure compensation, and the like.

A communication unit 110 has various communication functions conforming to RS232C, USB, IEEE 1394, P1284, SCSI, modem, LAN, and wireless communication. A connector/antenna 112 is a connector when the camera main unit 100 is connected to another device via the communication unit 110, or an antenna for wireless communication.

Reference numeral 120 designates an interface for connecting the camera main unit 100 to the lens unit 300 inside the lens mount 106.

Reference numeral 122 designates a connector that connects the camera main unit 100 to the lens unit 300 electrically. In addition, whether or not the lens mount 106 and/or the connector 122 are attached is detected by a lens detection unit, not shown. In addition to transmitting and receiving control signals, status signals, data signals and the like between the camera main unit 100 and the lens unit 300, the connector 122 is also provided with the capability to supply electrical current at various voltages. Moreover, the connector 122 may also be configured so as to be able to conduct not only electrical signals but also optical signals, sound signals and so forth as well.

Reference numerals 200 and 210 designate recording media such as a memory card, a hard disk or the like. The recording media 200 and 210 are each provided with recording parts 202 and 212 comprised of semiconductor memories, magnetic disks or the like; camera main unit 100 interfaces 204 and 212; and connectors 206 and 216 for connecting to the camera main unit 100.

As the recording media 200 and 210, memory cards such as PMCIA cards and compact flash (registered trademark) may be used, as well as hard disks or the like. In addition, the recording media 200 and 210 may be comprised of micro DAT, magneto-optic disks, CD-R and CD-RW optical disks, or DVD or other phase change-type optical disks.

It should be noted that, as the image sensing apparatus of the present embodiment, a description is given of a single-lens-reflex-type digital camera with interchangeable lenses. Alternatively, however, the image sensing apparatus may be a so-called digital compact camera, in which the lens and lens barrel are formed integrally with the camera main unit.

Figure 2:
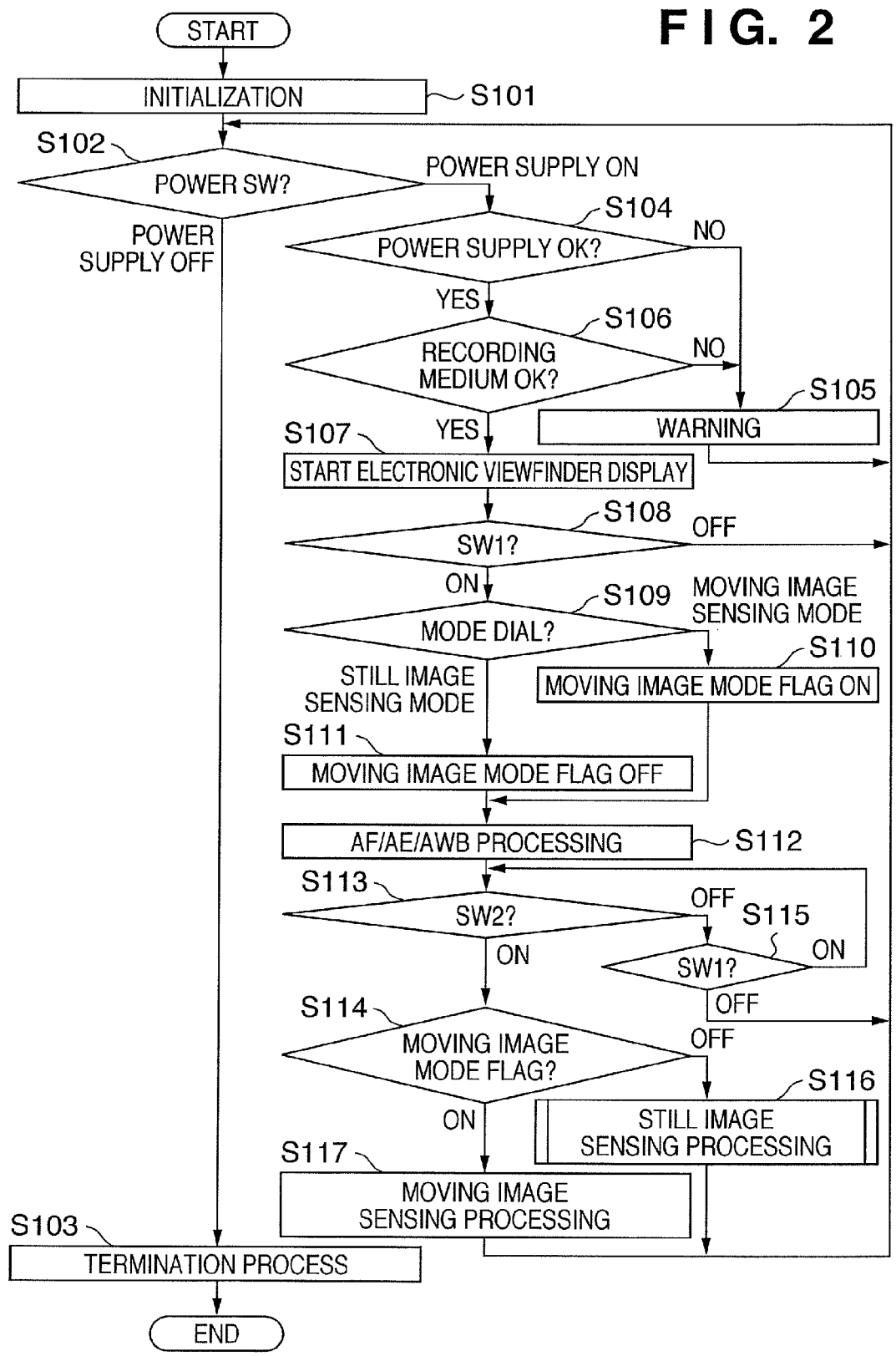
FIG. 2 is a flow chart illustrating basic operations of the image sensing apparatus of the embodiments of the present invention.

FIG. 2 is a flow chart illustrating basic routines relating to image sensing in an image sensing apparatus having the configuration described above.

With input of power by battery replacement or the like, the system controller 50 initializes flags and control variables and carries out certain initial settings necessary for each part of the camera main unit 100 (step S101).

Next, the system controller 50 determines the set position of the power switch 72 (step S102). If the power switch 72 is set to power OFF, then the system controller 50 changes the displays of the display units to an end state and records the setting mode and the necessary parameters and settings, including the flags and the control variables, in the nonvolatile memory 56. Further, the system controller 50 ends the routine after carrying out certain termination processes such as cutting off unneeded power to respective parts of the image sensing apparatus including the image display unit 28, using the power control unit 80 (step S103).

If in step S102 the power switch 72 is set to power ON, the routine proceeds to step S104. In step S104, the system controller 50 determines whether or not the remaining power and the operating condition of the power source 86, comprised of a battery or the like, poses a problem for the operation of the image sensing apparatus. If there is a problem (NO at step S104), the system controller 50 carries out a predetermined warning display involving images and sound using the notification unit 54 (step S105), after which the routine returns to step S102.

By contrast, if there is no problem with the power source 86 (YES at step S104), then the routine proceeds to step S106. In step S106, using the recording medium detection circuit 98 the system controller 50 determines whether or not the recording medium 200 or the recording medium 210 is attached, and acquires management information on the image data recorded on the recording medium 200 or 210. Further, the system controller 50 determines whether or not the operating state of the recording medium 200 or 210 poses a problem for the operation of the image sensing apparatus, in particular the operations of recording and reproducing the image data on the recording medium 200 or 210. If there is a problem (NO at step S106), the system controller 50 carries out a predetermined warning display involving images and sound using the notification unit 54 (step S105), after which the routine returns to step S102.

By contrast, if there is no problem with the recording medium 200 or 210 (YES at step S106), then the routine proceeds to step S107 and the system controller 50 starts electronic viewfinder display.

In electronic viewfinder display, the system controller 50, in a state in which the shutter 12 is open, causes the timing generator 18 to read out the electrical charges of the image sensor 14 in a predetermined cycle using methods such as line thinning, line addition or the like. Reading out the electrical charges of the image sensor 14 using such methods as line thinning, line addition and the like, reduces the number of pixels to a number of lines suitable for electronic viewfinder display as well as increases the rate to that necessary as a moving image for viewfinder display. Then, the signals read from the image sensor 14 are successively written as data to the image display memory 24 via the A/D converter 16 and the memory controller 22, and that data is then successively displayed by the image display unit 28 via the memory controller 22 and the D/A converter 26 to achieve electronic viewfinder display.

Next, in step S108, the system controller 50 determines the state of the shutter switch SW1 (62), and if the shutter switch SW1 (62) has not been pressed the routine returns to step S102. If the shutter switch SW1 (62) has been pressed, the system controller 50 detects the state of the mode dial switch 60 (step S109). If the mode dial switch 60 is set to still image sensing mode, the system controller 50 resets the moving image mode flag (step S111). If the mode dial switch 60 is set to moving image sensing mode, the system controller 50 sets the moving image mode flag (step S110). Then, the routine proceeds to AF/AE/AWB processing (step S112).

In step S112, first AF processing is carried out and the image sensing lens 310 is focused on the object. At this time, the system controller 50 directs light rays striking the image sensing lens 310 into the focus adjustment unit 42 via the aperture 312, the lens mounts 306 and 106, the mirror 130, and a photometric sub-mirror, not shown, and determines the state of focus of the image formed as an optical image. Then, the system controller 50 executes AF control to detect the state of focus using the focus adjustment unit 42 while driving the image sensing lens 310 using the focus control unit 342 until it is determined that the image is in focus. Once it is determined that the image is in focus, the system controller 50 determines focused photometric points from among a plurality of photometric points within an image sensing frame and stores data on the set photometric points together with focus data and/or setting parameters to an internal memory of the system controller 50 or to the memory 52.

Next, AE processing is carried out. Here, first, the system controller 50 directs light rays striking the lens 310 into the photometry control unit 46 via the aperture 312 and a photometric lens, not shown, and measures the state of exposure of the image formed as an optical image. The system controller 50 then carries out photometric processing using the photometry control unit 46 until the exposure is determined to be proper.

Once it is determined that the exposure is proper, the system controller 50 stores the photometric data and/or the setting parameters in the internal memory of the system controller 50 or in the memory 52. Then, based on the detected exposure results, system controller 50 determines the sensitivity value (Dv value), the aperture (f number) value (Av value), and the shutter speed (Tv value). In addition, if necessary based on the photometry results, the system controller 50 also sets the flash flag to set the flash. Then, based on the shutter speed (Tv value) thus set here, the system controller 50 determines the charge accumulation period of the image sensor 14. Further, the system controller 50 determines the input D (dynamic) range of the A/D converter 16 according to the sensitivity value (Dv value) thus set here.

Further, the system controller 50, after AF and AE processing, carries out certain calculations in the image processor 20 using sensed image data. Then, based on the calculation results thus obtained the system controller 50 stores WB setting parameters for WB (white balance) processing in the system controller 50 internal memory or in the memory 52 and ends AF/AE/AWB processing (step S112).

It should be noted that transmission and reception of various signals between the system controller 50 on the one hand and the aperture control unit 340 or the focus control unit 342 on the other are carried out through the interface 120, the connectors 122 and 322, the interface 320, and the lens system controller 350.

After completion of AF/AE/AWB processing (step S112), the state of the shutter switch SW2 (64) is checked. If the shutter switch SW2 (64) has been pressed (ON at step S113), then the moving image mode flag is checked (step S114). If the moving image mode flag has been reset, then the routine proceeds to still image sensing processing (step S116). If the moving image mode flag has been set, then the routine proceeds to moving image sensing processing (step S117).

By contrast, if the shutter switch SW2 (64) has not been pressed (OFF at step S113), the current process is repeated until the shutter switch SW1 (62) is released (i.e., while ON at step S115). When the shutter switch SW1 (62) is released (OFF at step S115), the routine returns to step S102.

Once still image sensing processing (step S116) or moving image sensing processing (step S117) are completed, the process returns to step S102. A detailed description of the still image sensing processing of step S116 is given later. The moving image sensing processing of step S117 may be carried out using well known moving image sensing method, and, since it is not directly related to the invention of the present application, a detailed description thereof is omitted herein.

Figure 3:
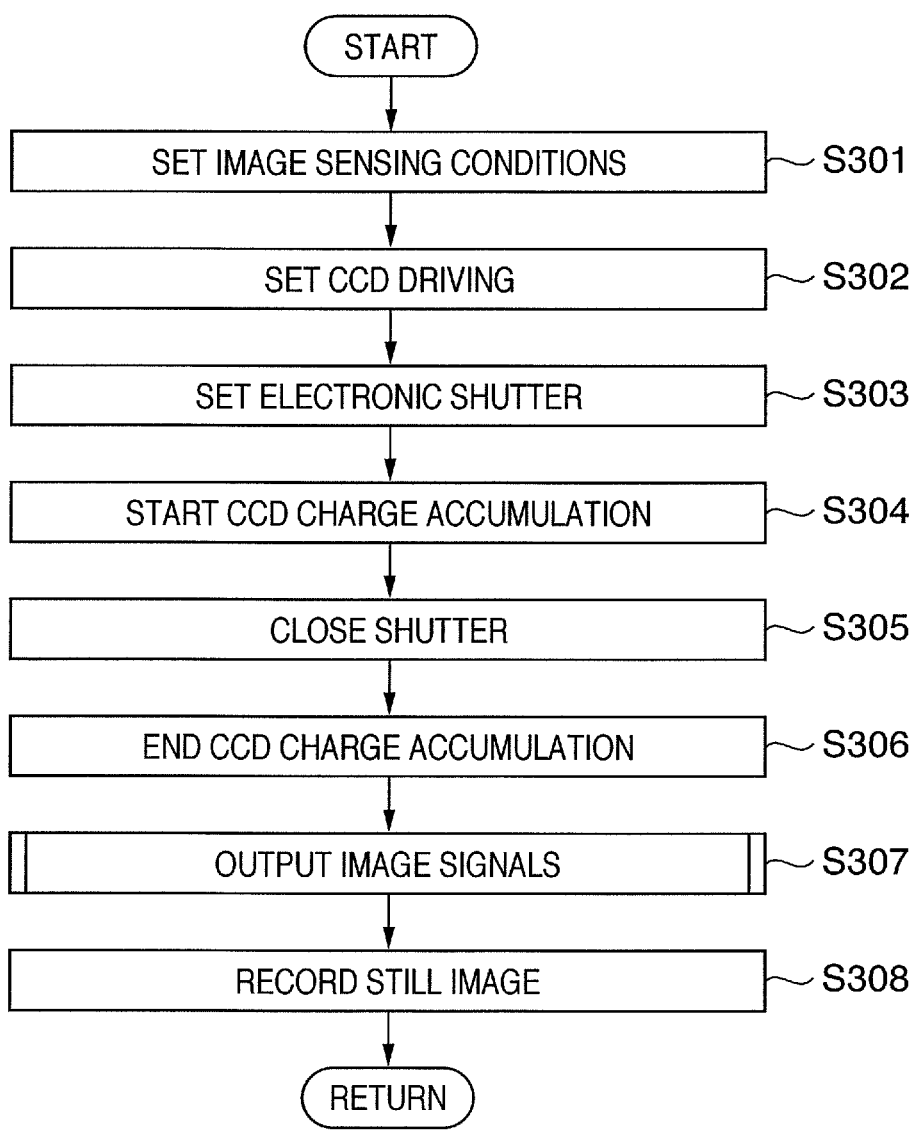
FIG. 3 is a flow chart illustrating still image sensing processing of a first embodiment of the present invention.

FIG. 3 is a flow chart illustrating details of the still image sensing processing of step S116 shown in FIG. 2.

In the still image sensing processing shown in FIG. 3, transmission and reception of various signals between the system controller 50 on the one hand and the aperture control unit 340 or the focus control unit 342 on the other are carried out through the interface 120, the connectors 122 and 322, the interface 320, and the lens system controller 350.

First, in step S301, the system controller 50, in accordance with photometric data and exposure conditions such as aperture value (Av), shutter speed (Tv) and the like stored in the internal memory or the memory 52, drives the aperture 312 to a predetermined aperture value using the aperture control unit 340. Then, using the timing generator 18, the system controller 50 carries out CCD driving mode setting (step S302) and electronic shutter setting (step S303), and starts exposure of the image sensor 14 (step S304).

The system controller 50 waits for exposure of the image sensor 14 in accordance with the photometric data to end, closes the shutter 12 using the shutter control unit 40 (step S305), and ends exposure of the image sensor 14 (step S306). In step S307, the system controller 50 controls to read out the image signals from the image sensor 14. In the embodiments to be described hereinafter, image signals are read out in division over a plurality of fields, then the read image data of the plurality of fields are combined by a synthesizing circuit (not shown) to generate a single synthesized image. Then the synthesized image is written as still image data in a predetermined area of the memory 30 via the A/D converter 16, the image processor 20, and the memory controller 22, or from the A/D converter 16 directly through the memory controller 22.

A detailed description of the process of reading out the image signals carried out in step S307 is given later, with reference to FIG. 4.

In still image recording processing (S308), the system controller 50 controls to read out a portion of the image data written to a predetermined area of the memory 30 via the memory controller 22. Then, the system controller 50 carries out WB integration calculation and OB integration calculation processing necessary in order to carry out development processing, and stores the results of those calculation in the system controller 50 internal memory or in the memory 52. Thereafter, the system controller 50, using the memory controller 22 and as necessary the image processor 20, reads out the sensed image data written to the predetermined area of the memory 30. Then, using the calculation results stored in the system controller 50 internal memory or in the memory 52, the system controller 50 controls to carry out various development processes, including AWB processing, gamma conversion processing, and color conversion processing.

Thereafter, the system controller 50 controls to once again read out the image data written to the predetermined area of the memory 30 and carries out image compression according to the set mode using the compression/expansion circuit 32. Then, in an empty image portion of an image storage buffer area of the memory 30, the system controller 50 controls to write the sensed and processed image data. Attendant upon the execution of an image sensing series, the system controller 50 controls to read out the image data stored in the image storage buffer area of the memory 30. Then, the system controller 50 starts recording processing, in which the image data is written to the recording medium 200 or 210, such as the memory card, the compact flash (registered trademark) card and the like, through the interface 90 or 94 and the connector 92 or 96.

The above-described recording processing is executed for image data each time the writing of such sensed and processed image data to the empty image portion of the image storage buffer area of the memory 30 is carried out. It should be noted that, while the image data is being written to the recording medium 200 or 210, a display indicating a recording medium write operation is carried out at the notification unit 54, for example by a flashing LED, in order to inform a user that a write operation is in progress. In addition, for the image data recorded on the recording medium 200 or 210, a resized image resized to an image size suitable for the image display unit 28 is separately generated and stored in the image display memory 24. This resized image is displayed on the image display unit 28 for a previously determined sensed image display time period.

Once this series of processes is finished, the system controller 50 ends still image sensing processing (step S116) and returns to the basic operating routine shown in FIG. 2.

(First Embodiment)

The image sensor 14, as described above, has a built-in interline-type CCD solid-state image sensing element, such that the charges of all the pixels can be read out in division over a plurality of fields. The basic readout method is assumed to be the same readout method as the 3-field readout described using FIG. 19 in the background art.

Figure 13:
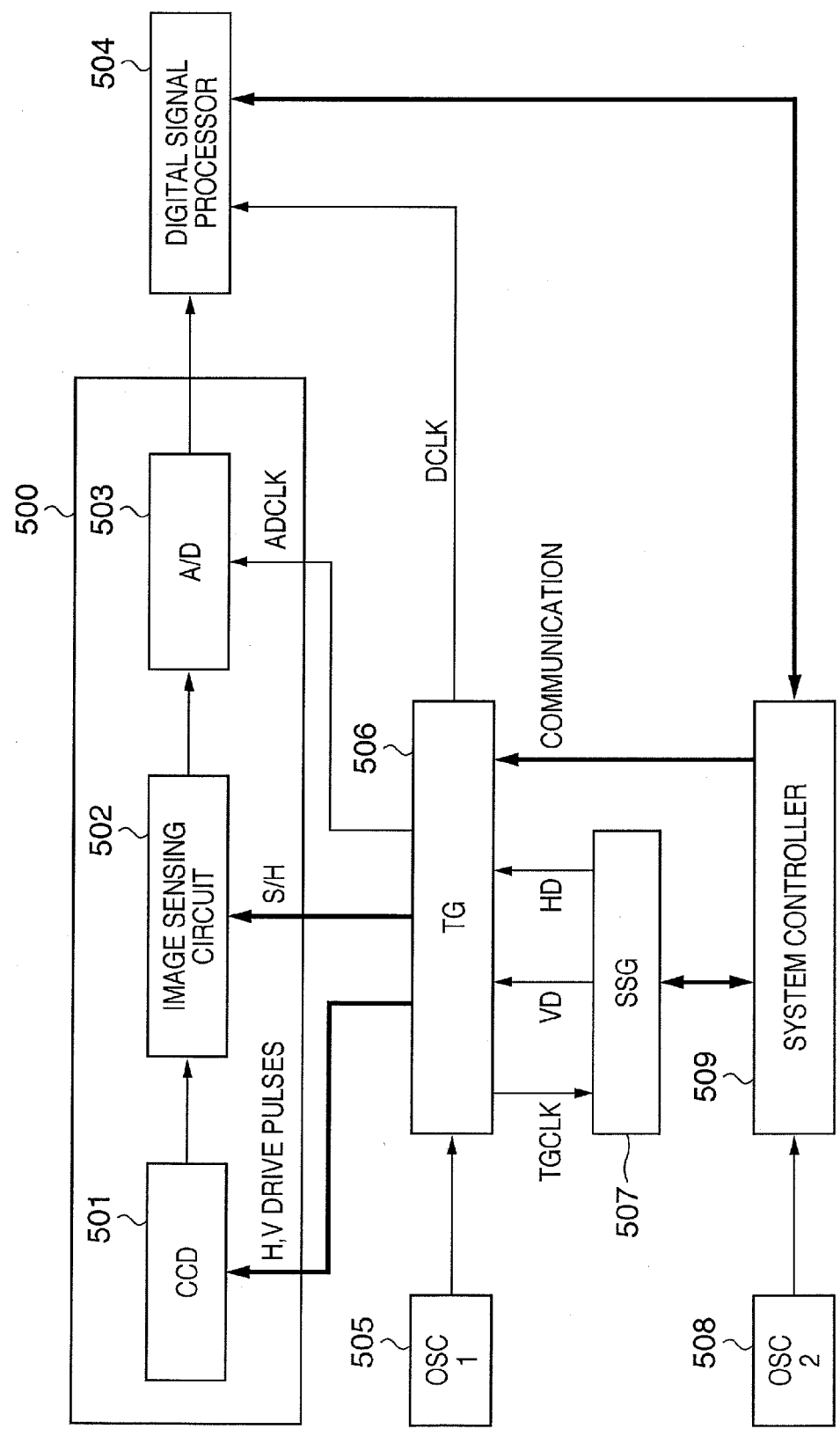
FIG. 13 is a block diagram showing schematically a configuration of an image sensing part inside a conventional digital camera

In addition, the basic configuration consisting of the analog image sensing signals area including the image sensor 14 and the A/D converter 16 as well as of the timing generator 18 shown in FIG. 1, is comprised of the same constituent elements as the configuration of the image sensing part described in the background art with reference to FIG. 13. A function identical to the sync signal generator (SSG) 507 shown in FIG. 13 is built into the system controller 50. Moreover, a function identical to the oscillation circuit OSC1 (505) is built into the timing generator 18, and a function identical to the oscillation circuit OSC2 (508) is built into the system controller 50. It should be noted that the digital signal processor 504 shown in FIG. 13 is shown not as the single configuration shown in FIG. 1 but as a more detailed configuration, divided into the image processor 20, the memory controller 22 and image display memory 24.

Figure 4:
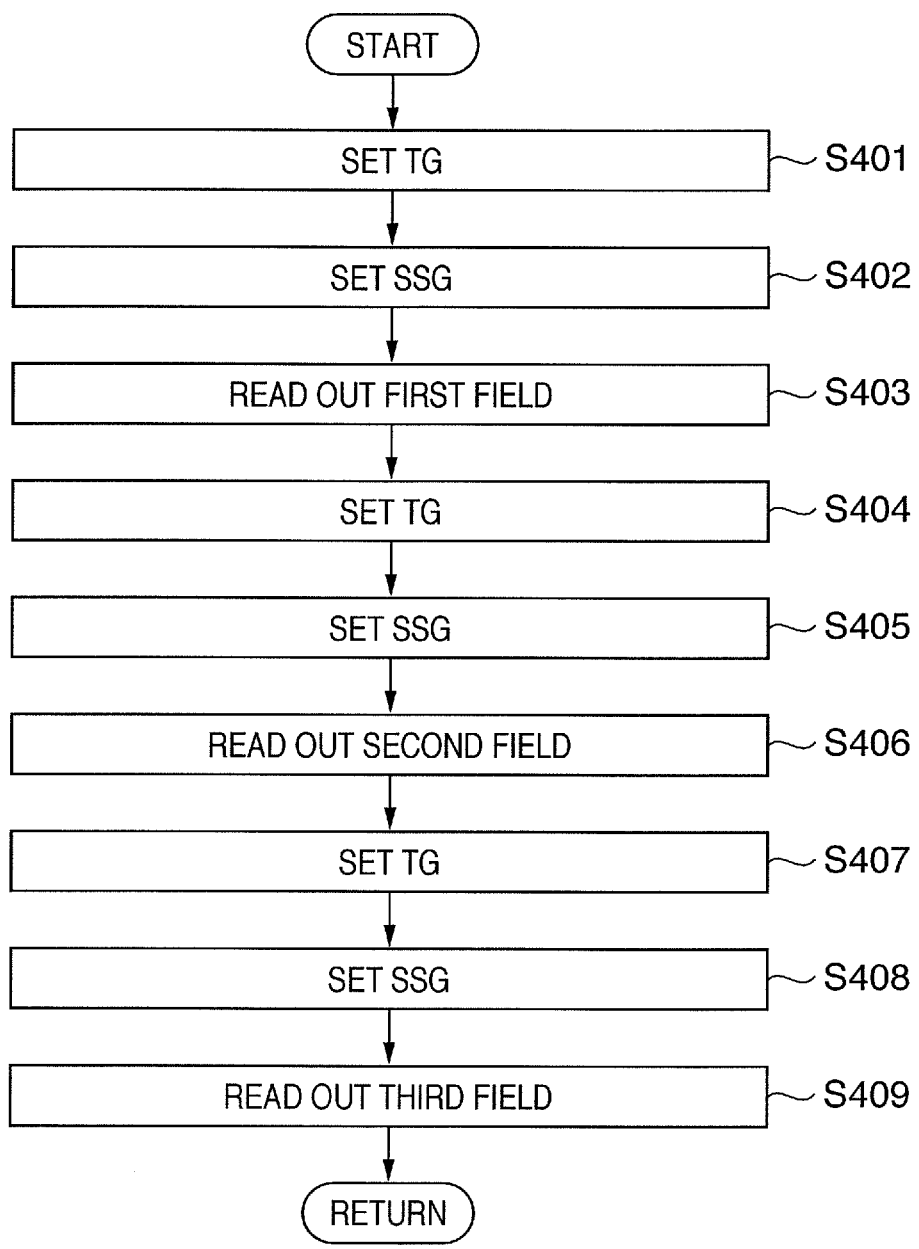
FIG. 4 is a flow chart illustrating an image signals readout process of the first embodiment of the present invention.

Next, a detailed description is given of the image sensing signal readout process carried out in step S307 shown in FIG. 3, with reference to the flow chart shown in FIG. 4.

In the image sensing signal readout process (step S307) shown in FIG. 4, with regard to the image sensing electrical charges, in the still image sensing processing shown in FIG. 3 that is the upstream flow the process of exposure/charge accumulation is completed, and therefore a process of reading out charges in division over three fields is conducted.

First, the system controller 50 sets the timing generator 18 so that the image sensor 14 outputs a first field of signals (step S401). The system controller 50, using a built-in sync signal generator, sets a cycle of vertical and horizontal sync signals (VD, HD) to be supplied to the timing generator 18 and starts supply thereof (step S402). The timing generator 18 synchronizes with the vertical and horizontal sync signals (VD, HD) thus supplied, and starts and finishes readout of the first field of signals from the image sensor 14 (for example, signals corresponding to 1, 4, 7 . . . N−2 lines) (step S403).

Next, the system controller 50 sets the timing generator 18 so that the image sensor 14 outputs a second field of signals (step S404). The system controller 50, using the built-in sync signal generator, sets a new cycle of the vertical and horizontal sync signals (VD, HD) to be supplied to the timing generator 18 and starts supply thereof (step S405). The timing generator 18 synchronizes with the vertical and horizontal sync signals (VD, HD) thus supplied, and starts and finishes readout of the second field of signals from the image sensor 14 (for example, signals corresponding to 2, 5, 8 . . . N−1 lines) (step S406).

Similarly, the system controller 50 sets the timing generator 18 so that the image sensor 14 outputs a third field of signals (step S407). The system controller 50, using the built-in sync signal generator, sets a new cycle of the vertical and horizontal sync signals (VD, HD) to be supplied to the timing generator 18 and starts supply thereof (step S408). The timing generator 18 synchronizes with the vertical and horizontal sync signals (VD, HD) thus supplied, and starts and finishes readout of the third field of signals from the image sensor 14 (for example, signals corresponding to 3, 6, 9 . . . N lines) (step S409).

Once this series of processes is finished, the system controller 50 ends the image sensing signal readout process (step S307) and returns to the still image sensing processing flow shown in FIG. 3.

Figure 5A:
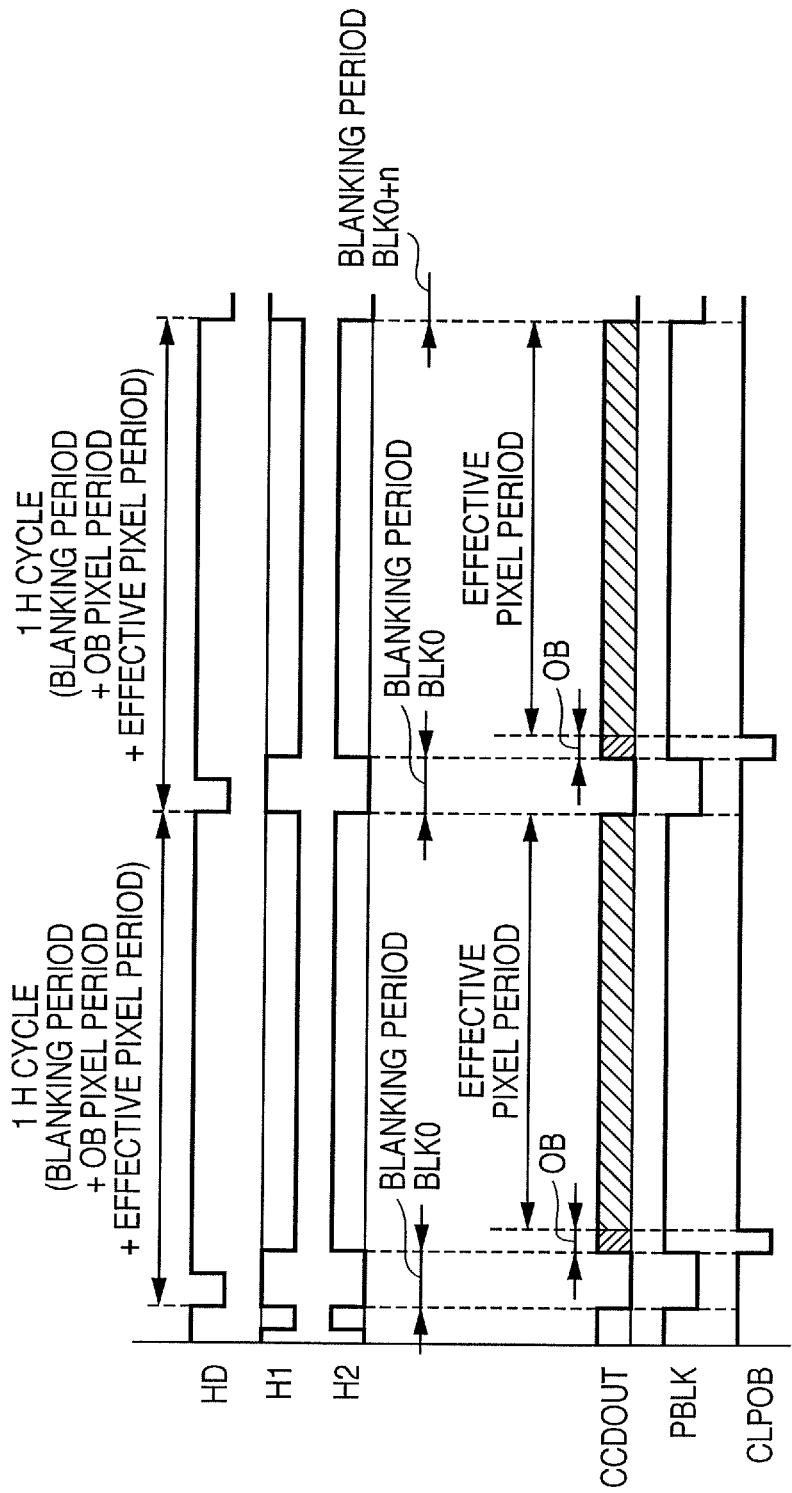
FIGS. 5A through 5C are timing charts illustrating changes in horizontal period in the first embodiment of the present invention.
Figure 5B:
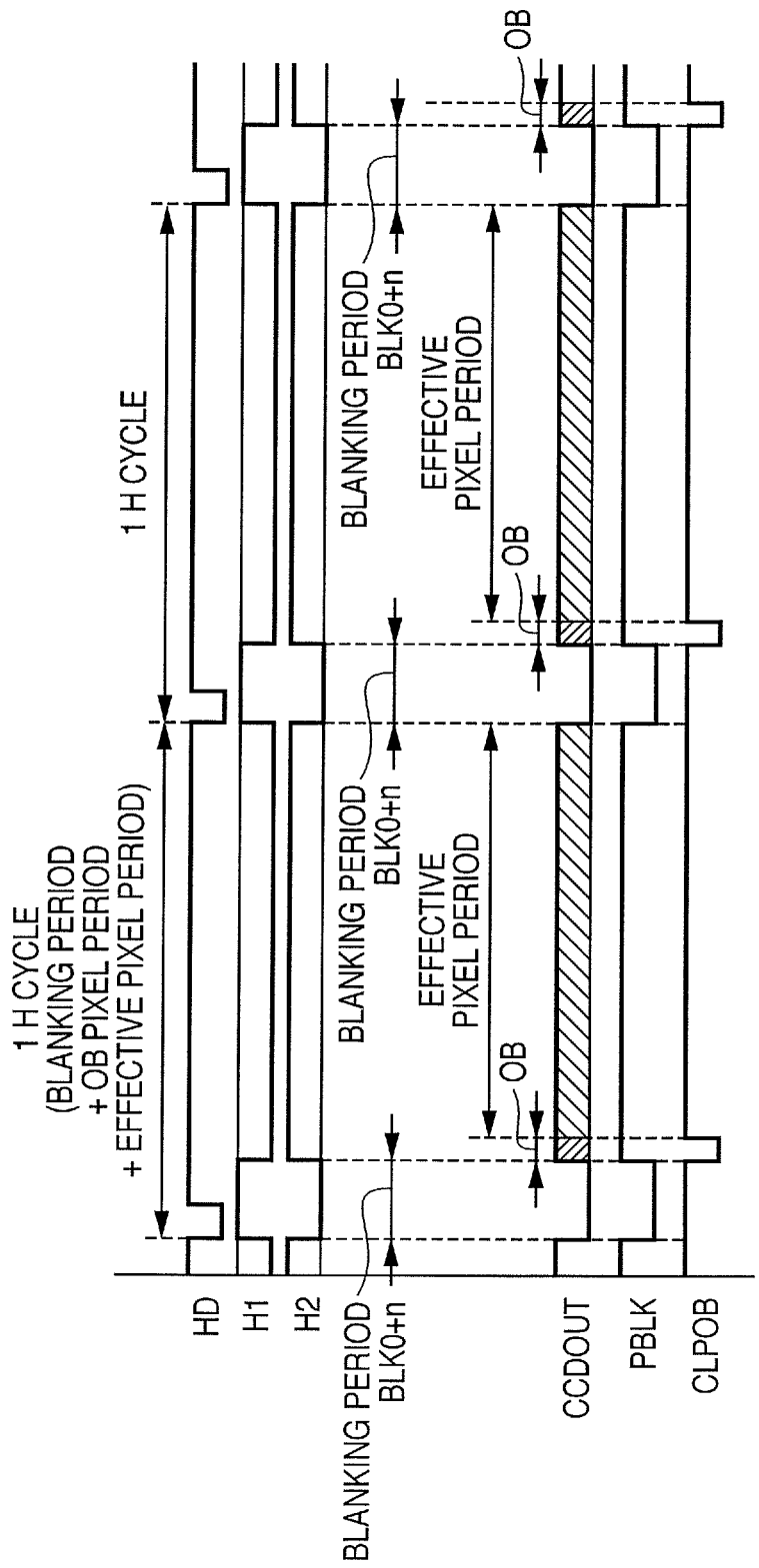
Figure 5C:
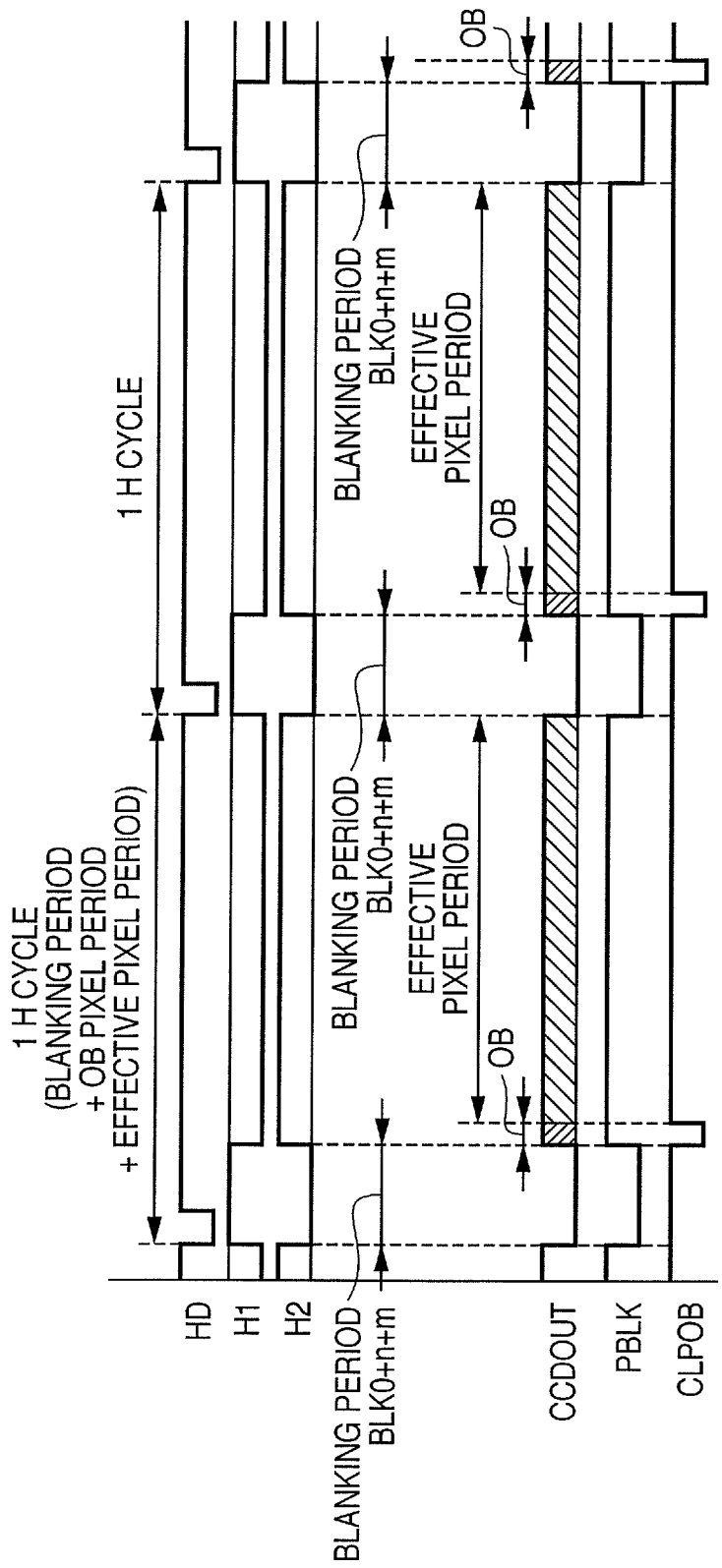

FIGS. 5A through 5C are timing charts illustrating changing the horizontal cycle by adjusting the length of the horizontal blanking period at each field signal. FIG. 5A is a timing chart showing the length of the horizontal blanking period in each horizontal (1 H) period when reading out the first field. In addition, FIG. 5B and FIG. 5C are timing charts showing the length of the horizontal blanking period of the horizontal periods when reading out the second and the third fields, respectively.

In the case of a CCD, the number of pixel clocks that comprise one horizontal period of the image signals is divided broadly into a blanking period, in which the HCCD 4 transfer drive pulses (H1, H2) are stopped, and a pixel readout period in which the HCCD 4 transfer drive pulses (H1, H2) are driven (OB period+effective pixel period).

In the first embodiment of the present invention, as shown in FIGS. 5A through 5C, by changing the length of the horizontal blanking period at each field period the horizontal cycle can be varied without affecting the pixel readout period.

As shown in FIG. 5A, the pixel clock number of the blanking period when reading out the first field is "BLK0". When reading out the succeeding second field, as shown in FIG. 5B the pixel clock number of the blanking period is changed to BLK0+n, in which n clocks are added to BLK0. As a result, the cycle of the horizontal lines when reading out the second field can be made longer than when reading out the first field. Similarly, when reading out the succeeding third field, as shown in FIG. 5C the pixel clock number of the blanking period is changed to BLK0+n+m, in which m clocks are further added to BLK0+n. It should be noted that either n=m or n≠m is acceptable. As a result, the blanking period when reading out the third field is made to be different from the blanking periods when reading out the first and the second fields.

As a specific operation, in the TG setting process (S401, S404, and S407 shown in FIG. 4) in the image sensing signal readout process (step S307) shown in FIG. 3 described above, the following settings are carried out. Specifically, when reading out the first field, in step S401 the system controller 50 sets the horizontal blanking active period for the timing generator 18 to BLK0. In addition, when reading out the second field, in step S404 the system controller 50 sets the horizontal blanking active period for the timing generator 18 to BLK0+n. Further, when reading out the third field, in step S407 the system controller 50 sets the horizontal blanking active period for the timing generator 18 to BLK0+n+m.

The timing generator 18 accepts information of the set horizontal blanking active period from the system controller 50 and sets it as the horizontal blanking period while the PBLK is LOW. The timing generator 18 has a function that starts to supply all horizontal timing signals to the analog signal processing area including the image sensor 14 and the A/D converter 16 when the horizontal blanking periods end. For example, in the case of a clamping pulse (CLPOB), as can be seen from FIGS. 5A through 5C, taking the beginning of the horizontal periods as a reference, the timing of the output of the clamping pulse (CLPOB) changes in conjunction with the expansion of the PBLK (horizontal blanking period). It should be noted that the clamping pulse is a pulse that indicates an OB pixel period for carrying out adjustment of the DC voltage level so that the OB pixel level becomes a black reference value of an image signal.

Next, a description is given of changes in frame image reconfigured from read-out field images brought about by changing the horizontal cycle at each field using the horizontal blanking period in the image sensing signal readout process (step S307).

In the background art, a description has already been given of how the fixed pitch noise that is superimposed on the image signals one-dimensionally changes in appearance depending on the number of pixel clocks that make up a single horizontal period for a two-dimensional image rendered horizontally and vertically by a CCD area sensor or the like. As described with reference to FIGS. 18A through 18E, for example, in the case of 5 pixel cycle fixed pitch noise, depending on the number of pixel clocks that comprise a single horizontal period the noise pattern formed has five variations according to cosets of 5. Although there is no change in the noise pitch in the horizontal direction in the patterns, the way in which the noise shows up changes slightly because the angle of the noise pattern on the rendered two-dimensional image changes.

The first embodiment of the present invention utilizes the fact that the above-described noise pattern angle changes in accordance with cosets of the noise pitch. That is, changing the horizontal cycle at each field image for the cyclical fixed pitch noise superimposed on the field images controls the angle of the noise pattern on the rendered two-dimensional image. In addition, this method, as described above, adjusts the length of the horizontal blanking period and changes the horizontal cycle, and thus there is no effect whatsoever on the original image that contributes to display.

FIGS. 6A through 6D show examples of noise patterns of 5 pixel cycles superimposed on the fields, in a case in which a single frame is read out in division over three fields.

FIG. 6A shows a noise pattern in a case in which the horizontal cycle of the first field is (5K+1), where K is a positive integer. Similarly, FIG. 6B and FIG. 6C respectively show noise patterns in cases in which the horizontal cycle of the second field is (5K+2) and the horizontal cycle of the third field is (5K+3). In addition, FIG. 6D shows an example of a noise pattern in which the first through third field images are reconfigured into a single frame.

As can be seen from FIGS. 6A through 6D, changing the horizontal blanking period by a single pixel clock causes the angle of the noise pattern between fields to change dramatically. As a result, on the frame image reconfigured from these field images, the cyclical characteristics of the noise patterns that the field images had originally are eliminated, producing an image in which the noise pattern is not easily discernible.

It should be noted that, where the relation between the pixel clock frequency and the system clock frequency that is the source of the fixed pitch noise generated is a free run, since the phase relation cannot be controlled phase shift due to frequency deviation and temperature drift occurs easily. However, with respect to the extent of change in phase due to frequency deviation and temperature drift, because the noise patterns change completely between fields as the horizontal cycle changes, the noise patterns between field images do not correlate and their characteristics are not amplified.

Thus, as described above, the first embodiment of the present invention varies the horizontal cycle by changing the length of the horizontal blanking period when reading out the fields, which destroys the periodicity of the cyclical noise and enables noise to be made no longer noticeable without affecting in any way the original image that contributes to display.

(Second Embodiment)

Next, a description is given of a second embodiment of the present invention.

The first embodiment described above uses a method that varies the horizontal cycle without affecting the pixel readout period by adjusting the length of the horizontal blanking period between fields. In the case of this method, it is necessary to change the start of driving of all of the horizontal timing signals supplied to the CCD elements in the image sensor 14, the analog signal processing circuit, and the A/D converter 16 in conjunction with the change in the timing of the end of the horizontal blanking period. As a result, although that function is provided in the timing generator 18 in the first embodiment, a situation in which the timing generator 18 is not provided with such a capability is also assumed.

If the timing generator 18 is one in which the timing of all the relevant horizontal timing signals can be changed programmably, then it is not impossible to change them all at once during the vertical blanking just prior to field readout. However, doing so would make the task of the system controller 50 more difficult. In addition, if there are timing signals of fixed timing that cannot be changed, or timing signals that can be set to change but such change is not effected immediately, then it is not possible to change the horizontal cycle during the vertical blanking period between fields using this method.

For this sort of timing generator 18, in the second embodiment of the present invention the changing of the horizontal cycle at each field is achieved using another method.

It has already been explained that, in the case of CCD image sensing elements, a single horizontal period is divided broadly into a blanking period, in which the HCCD 4 (FIG. 14) transfer drive pulses (H1, H2) are stopped, and a pixel readout period, in which the HCCD 4 transfer drive pulses (H1, H2) are driven (OB period+effective pixel period). In the second embodiment, the horizontal cycle is changed by adding an HCCD 4 empty transfer period to the end of the pixel readout period (OB period+effective pixel period), without changing the blanking period but leaving it as is.

Empty transfer means an empty read state in which signals in a state in which there are no accumulated electrical charges are output, in a case in which electrical charges accumulated in the photoelectric converter elements 1 in the effective pixel area are all read out via the HCCD 4, after which, further, transfer drive pulses (H1, H2) continue to be transmitted to the HCCD 4.

FIGS. 7A through 7C are timing charts illustrating changing the horizontal cycle by adjusting and changing the length of the empty transfer period of the HCCD 4 at each field. FIG. 7A is a timing chart showing the length of the empty transfer period in the horizontal (1 H) periods during readout of the first field. In addition, FIGS. 7B and 7C are timing charts showing the length of the empty transfer period in the horizontal periods during readout of the second and third fields, respectively.

As shown in FIG. 7A, the pixel clock number of the extra empty transfer period provided at the end of the effective pixel period during readout of the first field is "H0". When reading out the succeeding second field, n clocks are added to the number of clocks of the empty transfer period as shown in FIG. 7B and the length of the empty transfer period is changed to "H0+n clocks". Similarly, when reading out the succeeding third field, m clocks are added to H0+n as shown in FIG. 7C and the empty transfer period is changed to "H0+n+m clocks". It should be noted that either n=m or n≠m is acceptable. As a result, the empty transfer period when reading out the third field may be made to be different from the empty transfer periods when reading out the first and the second fields.

As a specific operation, in the TG setting process (S401, S404, and S407 shown in FIG. 4) in the image sensing signal readout process (step S307) shown in FIG. 3 described above, the following settings are carried out. Specifically, when reading out the first field, in step S401 the horizontal transfer drive pulses (H1, H2) corresponding to the horizontal sync signal HD from the system controller 50 to the timing generator 18 are maintained until the succeeding HD input. Then, at the succeeding HD input, the drive start times of all the horizontal timing signals supplied to the CCD elements in the image sensor 14 inside the image sensor 14 as well as to the analog signal processing circuit and the A/D converter 16 are reset.

As a result, it becomes unnecessary to change at each field the timing of the clamping pulse (CLPOB) indicating the OB pixel period as shown in the first embodiment described above.

In addition, the empty transfer period is for a period adjustment after completion of the HCCD 4 effective pixel period and is not carried out during the effective pixel period, and thus there is no risk of a succeeding electrical charge signal readout being adversely affected by a transfer-residual electrical charge of the HCCD 4. Therefore, there is no effect whatsoever on the original image that contributes to display.

Thus, as described above, the second embodiment of the present invention conducts an empty transfer after the effective pixel period, and by changing that empty transfer period at each field the horizontal cycle is varied. As a result, the periodicity of cyclical noise is destroyed, enabling noise to be made no longer noticeable without affecting whatsoever the original image that contributes to display.

It should be noted that, in the first and second embodiments described above, a description is given of an arrangement in which a single frame of electrical charge signals is read out in division over three fields. However, the number of fields over which the frame may be read is not limited to three, provided that the frame is read out over multiple fields.

(Third Embodiment)

Next, a description is given of a third embodiment of the present invention. In the third embodiment, the still image sensing processing in step S116 shown in FIG. 2 is different from the processing described with reference to FIG. 3, and is described below with reference to the flow chart shown in FIG. 8 and the timing chart shown in FIG. 9.

Figure 8:
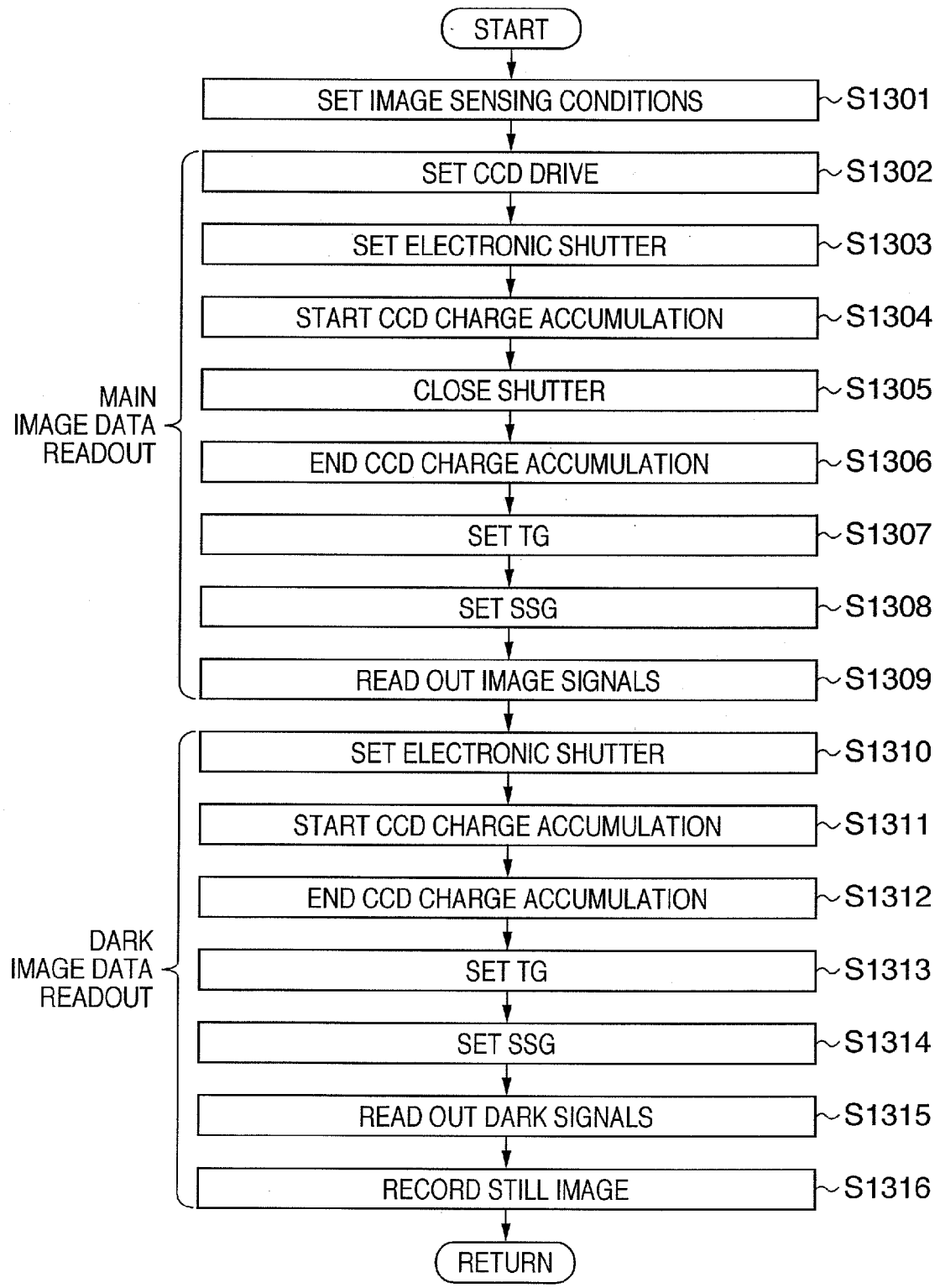
FIG. 8 is a flow chart illustrating still image sensing processing in a third embodiment of the present invention.

FIG. 8 is a flow chart illustrating the still image sensing processing in step S116 shown in FIG. 2. FIG. 9 is a timing chart illustrating the image sensing operation in the still image sensing processing.

In the still image sensing processing shown in FIG. 8, the exchange of various signals between the system controller 50 and the aperture control unit 340 or the focus control unit 342 is carried out through the interface 120, the connectors 122 and 322, the interface 320, and the lens system controller 350.

First, in step S1301, the system controller 50, in accordance with exposure conditions and photometric data such as the aperture (f number) value (Av), the shutter speed (Tv) and the like stored in the internal memory or in the memory 52, drives the aperture 312 to a predetermined aperture value using the aperture control unit 340. Then, using the timing generator 18, the system controller 50 sets the CCD drive mode (step S1302) and the electronic shutter (step S1303), and starts exposure of the image sensor 14 (step S1304).

The system controller 50 awaits the end of exposure of the image sensor 14 in accordance with the photometric data, closes the shutter 12 via the shutter control unit 40 (step S1305), and ends exposure of the image sensor 14 (step S1306). Then, the system controller 50 sets the timing generator 18 to read out the image signals from the image sensor 14 (first setting) (step S1307). The system controller 50, using a built-in sync signal generator, sets the cycles of the vertical and horizontal sync signals to be supplied to the timing generator 18 and starts to supply them (step S1308). The system controller 50 then reads out the image signals from the image sensor 14 in sync with the vertical and horizontal sync signals supplied from the timing generator 18 (step S1309). At this point, the electrical charge signals from the image sensor 14 are read out and written as still image data to a predetermined area of the memory 30 through the A/D converter 16, the image processor 20, and the memory controller 22, or directly from the A/D converter via the memory controller 22. It should be noted that image sensing in order to record image data obtained by exposure of the image sensor 14 described above is hereinafter referred to as "main image sensing", and the images and image data thus obtained are referred to as "main image" and "main image data", respectively. It should be noted that main image data corresponds to the first image signals in the claims, and the processes of from steps S1303 to step S1309 correspond to the first image sensing operation in the claims.

Next, the system controller 50 once again sets the electronic shutter (step S1310) and starts exposure of the image sensor 14 with the shutter 12 closed (CCD charge accumulation) (step S1311). Then, after the same charge accumulation period as that during main image sensing elapses, the system controller 50 ends exposure (step S1312). It should be noted that image sensing with the shutter 12 closed is hereinafter referred to as "dark image sensing". The system controller 50 sets the timing generator 18 to read out the image signals in dark image sensing from the image sensor 14 (second setting) (step S1313). The system controller 50, using a built-in sync signal generator, sets new cycles of the vertical and horizontal sync signals to be supplied to the timing generator 18 and also starts to supply them (step S1314). The timing generator 18 then provides drive signals to the image sensor 14 to read out the image signals from the image sensor 14 in sync with the vertical and horizontal sync signals thus supplied (step S1315). At this point, the electrical charge signals are read out from the image sensor 14 and written as image data to a predetermined area of the memory 30 through the A/D converter 16, the image processor 20, and the memory controller 22, or directly from the A/D converter 16 via the memory controller 22. It should be noted that the image and the data obtained by dark image sensing are herein after referred to as "dark image" and "dark image data", respectively. It should also be noted that the dark image data corresponds to the second image signals in the claims and that the processes of from step S1310 to step S1315 described above correspond to the second image sensing operation in the claims.

Next, in still image recording processing (step S1316), first, the system controller 50 subtracts the dark image data from the main image data written to the predetermined area of the memory 30, and writes the data to the predetermined area of the memory 30 after carrying out a dark noise correction process that eliminates the dark current noise of the image sensor 14. The system controller 50 then controls to read out a portion of the dark current correction processed still image data through the memory controller 22, performs on it the AWB integration calculations and the OB integration calculations necessary for development processing, and stores the calculation results in the internal memory of the system controller 50 or in the memory 52.

The system controller 50, using the memory controller 22 and as necessary the image processor 20, reads out the dark current correction processed still image data written to the predetermined area of the memory 30. Then, using the calculation results stored in the internal memory of the system controller 50 or in the memory 52, the system controller 50 controls to carry out various development processes, including AWB processing, gamma conversion processing, and color conversion processing.

Thereafter, the system controller 50 controls to read out the dark current correction processed still image data written to the predetermined area of the memory 30 and carries out image compression according to the set mode using the compression/expansion circuit 32. Then, in the empty image portion of the image storage buffer area of the memory 30, the system controller 50 writes the sensed and processed image data. Attendant upon the execution of an image sensing series, the system controller 50 controls to reads out the image data stored in the image storage buffer area of the memory 30. Then, the system controller 50 starts writing the image data to the recording medium 200 or 210, such as the memory card, the compact flash (registered trademark) card and the like, through the interface 90 or 94 and the connector 92 or 96.

The above-described recording processing is executed for image data each time the writing of such sensed and processed image data to the empty image portion of the image storage buffer area of the memory 30 is carried out. It should be noted that, while the image data is being written to the recording medium 200 or 210, a display indicating a recording medium write operation is carried out at the notification unit 54, for example by a flashing LED, in order to inform a user that a write operation is in progress. In addition, for the dark current correction processed main image data recorded on the recording medium 200 or 210, a resized image resized to an image size suitable for the image display unit 28 is separately generated and stored in the image display memory 24. This resized image is displayed on the image display unit 28 for a previously determined sensed image display time period.

Once this series of processes is finished, the system controller 50 ends still image sensing processing (step S116) and returns to the basic operating routine shown in FIG. 2.

FIG. 9 is a timing chart illustrating the image sensing operation in still image sensing processing (step S116) according to the third embodiment.

In FIG. 9, VD denotes a vertical sync signal; HD, a horizontal sync signal; and φV, a vertical transfer pulse for reading out the pixel charges of the photoelectric converter elements 1 (FIG. 14) of the image sensor 14 to the VCCD 2.

A mechanical shutter that is the shutter 12, controls exposure by mechanically opening and closing the shutter 12, whereas an electronic shutter controls exposure by applying a pulse to the CCD sensor substrate electric potential and extracting the pixel electrical charges in the direction of the substrate (resetting). A time period from completion of the resetting of the pixel charges by the electronic shutter to closing of the mechanical shutter is the exposure period. A time period from completion of the resetting of the pixel electrical charges by the electronic shutter to readout of the pixel electrical charges of the photoelectric converter elements 1 to the VCCD 2 is the CCD charge accumulation period.

Figure 10A:
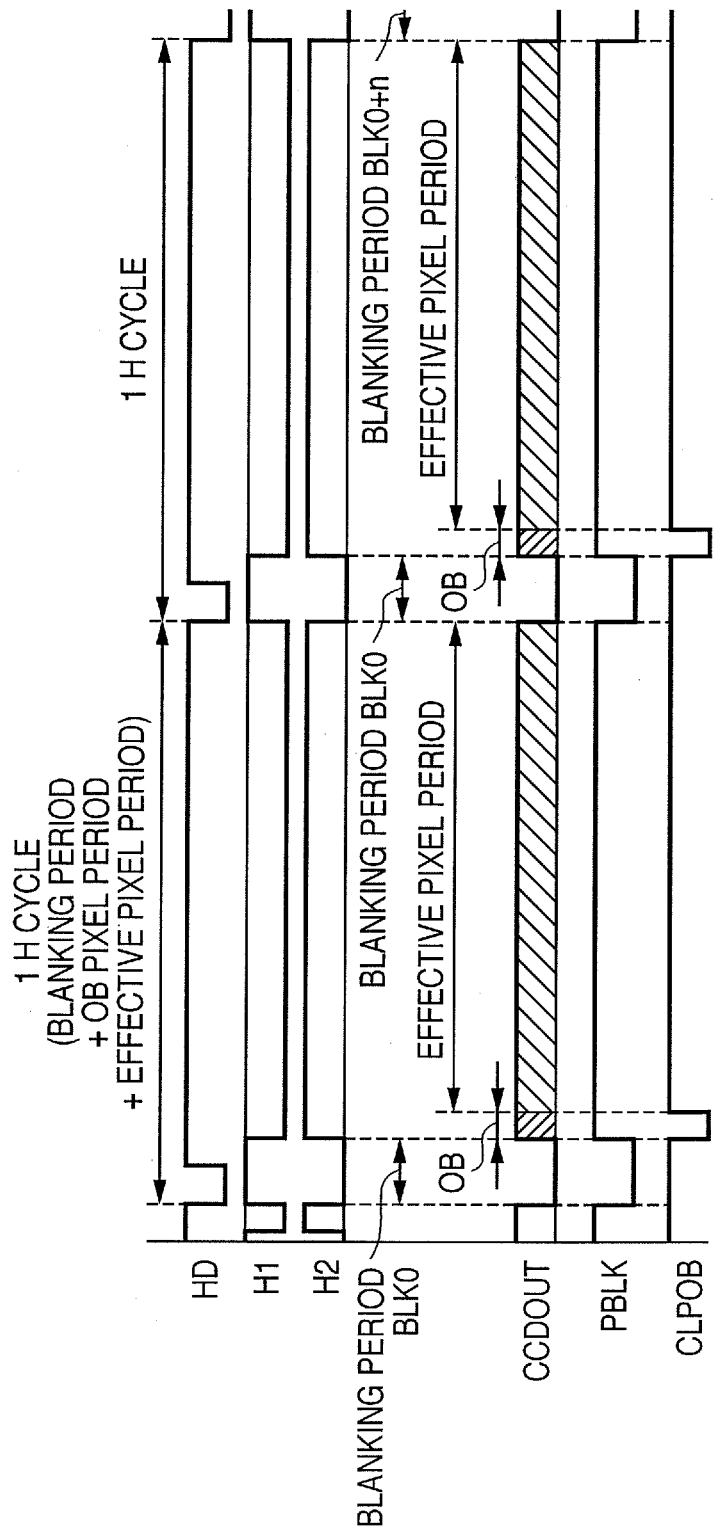

FIGS. 10A and 10B are timing charts illustrating changes in horizontal cycle caused by adjusting the length of the horizontal blanking period during main image sensing and during dark image sensing. FIG. 10A is a timing chart showing horizontal blanking period length in the horizontal (1 H) periods (first cycle) during main image sensing, and FIG. 10B is a timing chart showing horizontal blanking period length in the horizontal periods (second cycle) during dark image sensing.

In the case of a CCD, the number of pixel blocks that form a single horizontal cycle of image signals is broadly divided into the blanking period, in which the HCCD transfer drive pulses (H1, H2) are stopped, and the pixel readout period, in which the HCCD transfer drive pulses (H1, H2) are driven (OB period+effective pixel period).

In the third embodiment, as shown in FIG. 10A and 10B, during main image sensing and during dark image sensing, by changing the length of the horizontal blanking period, which is a period other than the effective pixel period, the horizontal cycle can be changed without affecting the pixel readout period.

As shown in FIG. 10A, the pixel clock number of the blanking period during main image sensing is set at "BLK0". By contrast, during dark image sensing, the pixel clock number of the blanking period is changed to "BLK0+n" by adding n clocks to BLK0 as shown in FIG. 10B. As a result, the horizontal line cycle during dark image sensing may be made longer than that during main image sensing.

As a specific operation, in the TG setting process (steps S1307, S1313) in the still image sensing processing (step S116) shown in FIG. 3 described above, the following settings are carried out. Specifically, during main image sensing, in step S1307, the system controller 50 sets the horizontal blanking active period for the timing generator 18 at BLK0 (first setting). During dark image sensing, in step S1313, the system controller 50 sets a horizontal blanking active period corresponding to (BLK0+n) (second setting) for the timing generator 18.

The timing generator 18 accepts information of the set horizontal blanking active period from the system controller 50 and sets it as the horizontal blanking period while the PBLK is LOW. The timing generator 18 has a function that starts to supply all horizontal timing signals to the analog signal processing area including the image sensor 14 and the A/D converter 16 when the horizontal blanking periods end. For example, in the case of the clamping pulse (CLPOB), as can be seen from FIGS. 10A and 10B, taking the beginning of the horizontal periods as a reference, the timing of the output of the clamping pulse (CLPOB) changes in conjunction with the expansion of the PBLK (horizontal blanking period). It should be noted that the clamping pulse is a pulse that indicates an OB pixel period for carrying out adjustment of the DC voltage level so that the OB pixel level becomes a black reference value of an image signal.

Next, a description is given of the way the noise changes in appearance with respect to the dark noise correction processed still image by changing the horizontal cycle between main image sensing and dark image sensing utilizing the blanking period in the still image sensing processing (step S116).

In the background art, a description has already been given of how the fixed pitch noise that is superimposed on the image signals one-dimensionally changes in appearance depending on the number of pixel clocks that make up a single horizontal period for a two-dimensional image rendered horizontally and vertically by a CCD area sensor or the like. As described with reference to FIGS. 18A through 18E, for example, in the case of 5 pixel cycle fixed pitch noise, depending on the number of pixel clocks that comprise a single horizontal period the noise pattern formed has five variations according to cosets of 5. Although there is no change in the noise pitch in the horizontal direction in the patterns, the way in which the noise shows up changes because the angle of the noise pattern on the rendered two-dimensional image changes.

The third embodiment of the present invention utilizes the fact that the above-described noise pattern angle changes in accordance with cosets of the noise pitch. That is, changing the horizontal cycle between main image sensing and dark image sensing for the cyclical fixed pitch noise superimposed on the main image and on the dark image respectively controls the angle of the noise pattern on the rendered two-dimensional image. In addition, this method, as described above, adjusts the length of the horizontal blanking period and changes the horizontal cycle, and thus there is no effect whatsoever on the original image that contributes to display.

FIGS. 11A through 11C show examples of noise patterns of 5 pixel cycles superimposed on the main image and on the dark image.

FIG. 11A shows a case in which the horizontal cycle during main image sensing is (5N+3), where N is a positive integer. FIG. 11B shows a noise pattern in which the blanking period is increased by one pixel clock during dark image sensing, and the horizontal cycle is set at (5N+4). In addition, FIG. 11C shows one example of a noise pattern in a dark noise correction processed still image obtained after subtracting the dark image having the noise pattern shown in FIG. 11B from the main image having the noise pattern shown in FIG. 11A.

As can be seen from FIGS. 11A though 11C, by changing the horizontal blanking period by one pixel clock the angle of the noise patterns between the main image and the dark image changes dramatically. As a result, the cyclical characteristics of the noise pattern that the main image had originally are eliminated, producing an image in which the noise pattern is not easily discernible.

It should be noted that, where the relation between the pixel clock frequency and the system clock frequency that is the source of the fixed pitch noise generated is a free run, since the phase relation cannot be controlled phase shift due to frequency deviation and temperature drift occurs easily. However, with respect to the extent of change in phase due to frequency deviation and temperature drift, because the noise patterns change completely between frames as the horizontal cycle changes, the noise patterns between the main image and the dark image do not correlate and thus their characteristics are not amplified.

Thus, as described above, the third embodiment of the present invention varies the horizontal cycle by changing the length of the horizontal blanking period between main image sensing and dark image sensing, which destroys the periodicity of the cyclical noise and enables noise to be made no longer noticeable without affecting in any way the original image that contributes to display.

(Fourth Embodiment)

Next, a description is given of a fourth embodiment of the present invention.

The third embodiment described above utilizes a method that varies the horizontal cycle without affecting the pixel readout period by adjusting the length of the horizontal blanking period between main image sensing and dark image sensing. In this method, it is necessary to change the timing of the start of driving of all the horizontal timing signals being supplied to the CCD elements in the image sensor 14 and to the analog processing circuit and the A/D converter 16 in conjunction with the change in timing of the end of the horizontal blanking period. As a result, although that function is provided in the timing generator 18 in the third embodiment, a situation in which the timing generator 18 is not provided with such a capability is also assumed.

If the timing generator 18 is one in which the timing of all the relevant horizontal timing signals can be changed programmably, then it is not impossible to change them all at once during the vertical blanking just prior to the start of dark image sensing. However, doing so would make the task of the system controller 50 more difficult. In addition, if there are timing signals of fixed timing that cannot be changed, or timing signals that can be set to change but such change is not effected immediately, then it is not possible to change the horizontal cycle during the vertical blanking period between frames using this method.

For this sort of timing generator 18, in the fourth embodiment of the present invention the changing of the horizontal cycle between main image sensing and dark image sensing is achieved using another method.

It has already been explained that, in the case of CCD image sensing elements, a single horizontal period is divided broadly into a blanking period, in which the HCCD 4 (FIG. 14) transfer drive pulses (H1, H2) are stopped, and a pixel readout period, in which the HCCD 4 transfer drive pulses (H1, H2) are driven (OB period+effective pixel period). In the fourth embodiment, the horizontal cycle is changed by adding an HCCD 4 empty transfer period to the end of the pixel readout period (OB period+effective pixel period). As a result, the length of a period other than the effective pixel period can be varied.

Empty transfer means an empty read state in which signals in a state in which there are no accumulated electrical charges are output, in a case in which electrical charges accumulated in the photoelectric converter elements 1 in the effective pixel area are all read out via the HCCD 4, after which, further, transfer drive pulses (H1, H2) continue to be transmitted to the HCCD 4.

Figure 12A:
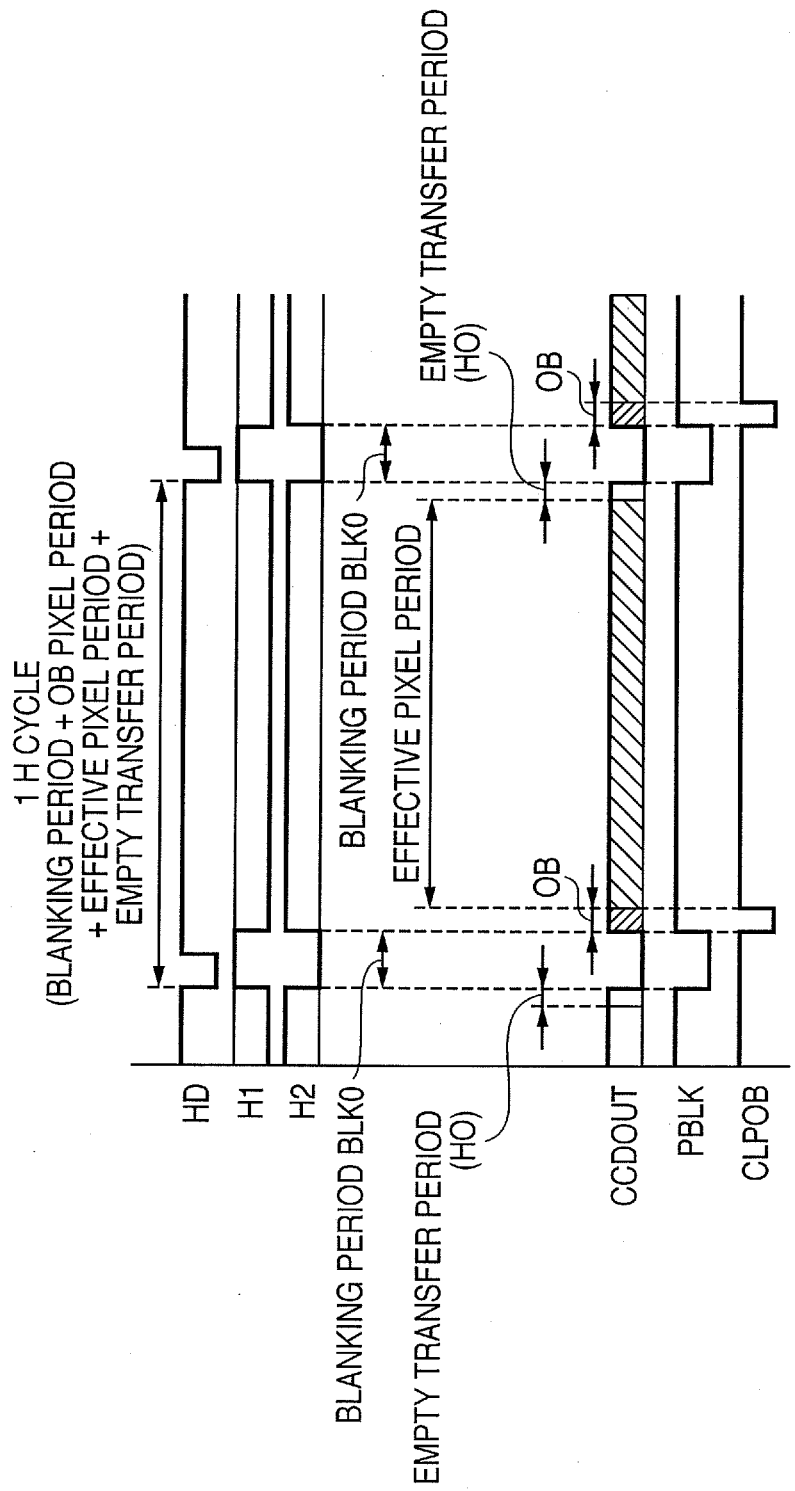
FIGS. 12A and 12B are timing charts illustrating changes in horizontal cycle in a fourth embodiment of the present invention.
Figure 12B:
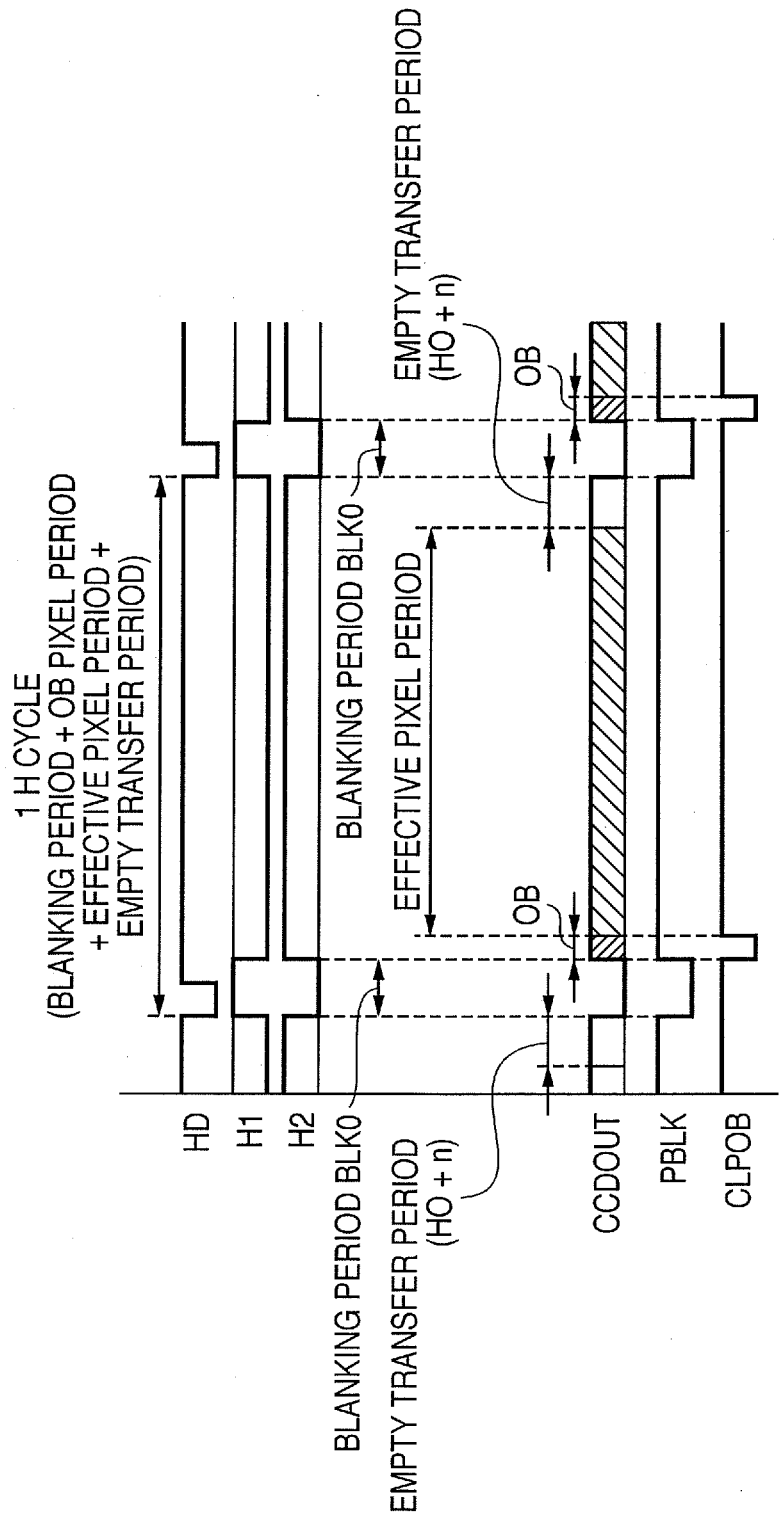

FIGS. 12A and 12B are timing charts illustrating changing the horizontal cycle by adjusting the length of the empty transfer period of the HCCD 4 between main image sensing and dark image sensing. FIG. 12A is a timing chart showing the length of the empty transfer period in the horizontal periods (a first cycle) during an image sensing operation during main image sensing, and FIG. 12B is a timing chart showing the length of the empty transfer period during an image sensing operation during dark image sensing (a second cycle).

As shown in FIG. 12A, the pixel clock number of the extra empty transfer period provided at the end of the effective pixel period during main image sensing is "H0". In this case, n clocks are added to the number of clocks H0 of the empty transfer period during the succeeding dark image sensing as shown in FIG. 12B and the length of the empty transfer period is changed to "H0+n clocks".

As a specific operation, in the TG setting process (steps S1307 and S1313) shown in FIG. 8 in the still image sensing signal processing (step S116) described above, the following settings are carried out. Specifically, during main image sensing, in step S1307 the horizontal transfer drive pulses (H1, H2) corresponding to the horizontal sync signal HD from the system controller 50 to the timing generator 18 are maintained until the succeeding HD input. Then, at the succeeding HD input, the drive start times of all the horizontal timing signals supplied to the CCD elements in the image sensor 14 as well as to the analog signal processing circuit and the A/D converter 16 are reset.

As a result, it becomes unnecessary to change at each frame the timing of the clamping pulse (CLPOB) indicating the OB pixel period as shown in the third embodiment described above.

In addition, the empty transfer period is a period adjustment after completion of the HCCD 4 effective pixel period and is not carried out during the effective pixel period, and thus there is no risk of a succeeding electrical charge signal readout being adversely affected by a transfer-residual electrical charge of the HCCD 4. Therefore, there is no effect whatsoever on the original image that contributes to display.

Thus, as described above, the fourth embodiment of the present invention conducts an empty transfer after the effective pixel period, and varies the horizontal cycle by changing that empty transfer period between main image sensing and dark image sensing. As a result, the periodicity of the cyclical noise is destroyed, enabling noise to be made no longer noticeable without affecting in any way the main image that contributes to display.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2006-298212, filed on Nov. 1, 2006 and 2007-093413, filed on Mar. 30, 2007, which are hereby incorporated by reference herein in their entirety.

What is claimed is:

1. An image sensing apparatus comprising:
   an image sensing unit configured to convert incoming light into electrical signals;
   a driving unit configured to drive said image sensing unit to output the electrical signals from said image sensing unit by each of a plurality of fields;
   an image processing unit configured to generate a frame of image based on the electrical signals of the plurality of fields output from said image sensing unit; and
   a control unit configured to control said driving unit to vary for each of the plurality of fields a length of a period other than an effective pixel period in each horizontal cycle.

2. The image sensing apparatus according to claim 1, wherein said control unit controls said driving unit to vary a length of a blanking period in each horizontal cycle for each of the plurality of fields.

3. The image sensing apparatus according to claim 1, wherein said control unit controls said driving unit to vary a length of an empty transfer period in each horizontal cycle for each of the plurality of fields.

4. The image sensing apparatus according to claim 1, wherein each of the plurality of fields is composed of a predetermined number of lines.

5. A control method for an image sensing apparatus having an image sensing unit configured to convert incoming light into electrical signals, a driving unit configured to drive the image sensing unit to output the electrical signals from the image sensing unit by each of a plurality of fields, and an image processing unit configured to generate a frame of image based on the electrical signals of the plurality of fields output from the image sensing unit, said control method comprising:
   a first setting step of setting a length of a period other than an effective pixel period in each horizontal cycle to a first length;
   a first image sensing step of driving the image sensing unit under conditions set in said first setting step and obtaining the electrical signals of a first field of the plurality of fields;
   a second setting step of setting a length of the period other than the effective pixel period in each horizontal cycle to a second length different from the first length; and
   a second image sensing step of driving the image sensing under conditions set in said second setting step and obtaining the electrical signals of a second field of the plurality of fields.

6. The control method according to claim 5, wherein in said first setting step, a length of a blanking period in each horizontal cycle is set to the first length, and in said second setting step, a length of the blanking period in each horizontal cycle is set to the second length.

7. The control method according to claim 5, wherein in said first setting step, a length of an empty transfer period in each horizontal cycle is set to the first length, and in said second setting step, a length of the empty transfer period in each horizontal cycle is set to the second length.

8. The control method according to claim 5, wherein each of the plurality of fields is composed of a predetermined number of lines.

* * * * *